US010396859B1

(12) United States Patent
Hong et al.

(10) Patent No.: US 10,396,859 B1
(45) Date of Patent: Aug. 27, 2019

(54) APPARATUS FOR WIRELESSLY TRANSMITTING POWER AFTER CONFIRMING LOCATION OF RECEIVER AND METHOD THEREOF

(71) Applicant: UNIVERSITY-INDUSTRY COOPERATION GROUP OF KYUNG HEE UNIVERSITY, Yongin-si, Gyeonggi-do (KR)

(72) Inventors: Een Kee Hong, Seongnam-si (KR); Jae Wan Park, Seoul (KR)

(73) Assignee: UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 0 days.

(21) Appl. No.: 16/202,220

(22) Filed: Nov. 28, 2018

(30) Foreign Application Priority Data

Jun. 29, 2018 (KR) ........................ 10-2018-0075115

(51) Int. Cl.
*H04B 5/00* (2006.01)
*H04W 4/80* (2018.01)
(Continued)

(52) U.S. Cl.
CPC .............. *H04B 5/0037* (2013.01); *G01S 3/38* (2013.01); *H04B 17/20* (2015.01); *H04W 4/80* (2018.02)

(58) Field of Classification Search
CPC ...... H04B 5/0037; H04B 17/20; H04B 17/27; H04W 4/80; H04W 52/283; H04W 64/00; G01S 3/38
See application file for complete search history.

(56) References Cited

U.S. PATENT DOCUMENTS 6,847,327 B2 * 1/2005 Ylitalo .................. H01Q 21/00
342/407
7,072,669 B1 * 7/2006 Duckworth ........... G01S 5/0215
455/404.2
(Continued)

FOREIGN PATENT DOCUMENTS

KR 10-1222768 B1 1/2013
KR 10-1341510 B1 12/2013
(Continued)

OTHER PUBLICATIONS

Korean Office Action for corresponding Application No. 10-2018-0075115 dated Aug. 3, 2018.

*Primary Examiner* — Andrew Wendell
(74) *Attorney, Agent, or Firm* — Sughrue Mion, PLLC

(57) ABSTRACT

Disclosed are an apparatus for wirelessly transmitting power characterized by confirming the location of a receiver and transmitting wireless power to the confirmed location. More particularly, the apparatus for wirelessly transmitting power includes a beamformer configured to form beams with a first width and sequentially transmit the formed beams with the first width to different spaces that are physically separated from each other and at least partially overlap; a reception part configured to receive reception power values corresponding to the transmitted beams with the first width; a calculator configured to calculate a phase of the receiver using a plurality of high reception power values based on magnitudes of the received reception power values; and an estimator configured to estimate a location of the receiver based on the calculated receiver phase, wherein wireless power is transmitted to the estimated receiver location.

15 Claims, 24 Drawing Sheets

(51) Int. Cl.
*G01S 3/38* (2006.01)
*H04B 17/20* (2015.01)

(56) References Cited

U.S. PATENT DOCUMENTS

| | | | | |
|---|---|---|---|---|
| 2003/0114195 | A1* | 6/2003 | Chitrapu | H01Q 1/246 455/562.1 |
| 2003/0181163 | A1* | 9/2003 | Ofuji | H01Q 1/1257 455/25 |
| 2006/0164969 | A1* | 7/2006 | Malik | H04B 7/0408 370/203 |
| 2010/0210221 | A1* | 8/2010 | Takano | H04B 7/0617 455/68 |
| 2013/0023278 | A1* | 1/2013 | Chin | H04W 64/00 455/456.1 |
| 2013/0343303 | A1* | 12/2013 | Kim | H04B 7/0452 370/329 |
| 2015/0054689 | A1* | 2/2015 | Oakley | G01S 3/043 342/417 |
| 2018/0088201 | A1* | 3/2018 | Fujio | G01S 3/48 |
| 2019/0044392 | A1* | 2/2019 | Chowdhury | H02J 50/80 |
| 2019/0103906 | A1* | 4/2019 | Athley | H04B 7/0452 |

FOREIGN PATENT DOCUMENTS

| | | |
|---|---|---|
| KR | 10-2014-0012240 A | 2/2014 |
| KR | 10-2014-0080320 A | 6/2014 |
| KR | 10-2017-0119482 A | 10/2017 |
| KR | 10-2018-0031188 A | 3/2018 |

\* cited by examiner

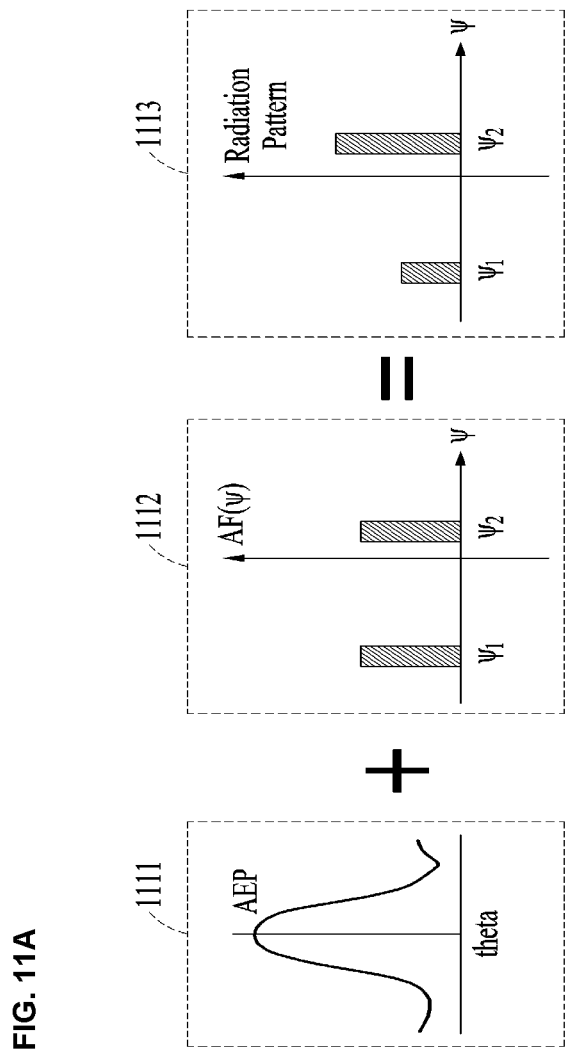

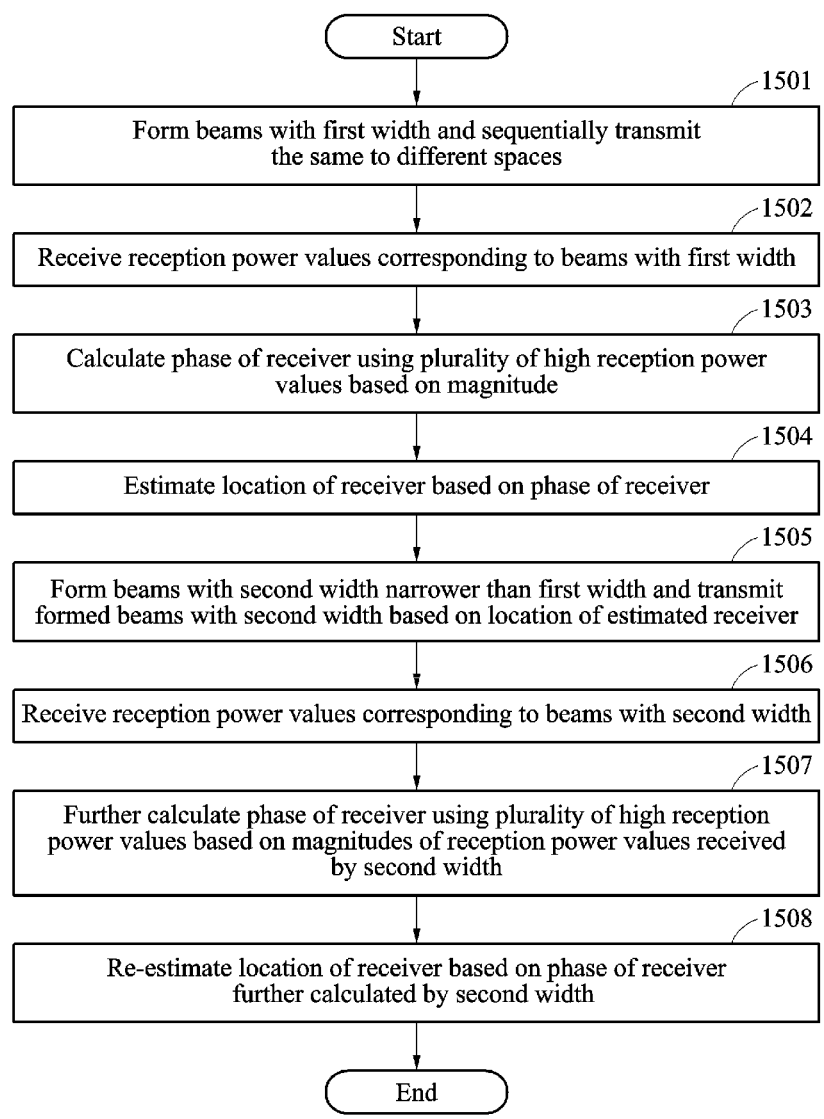

APPARATUS FOR WIRELESSLY TRANSMITTING POWER AFTER CONFIRMING LOCATION OF RECEIVER AND METHOD THEREOF

CROSS-REFERENCE TO RELATED APPLICATION

This application claims priority to Korean Patent Application No. 10-2018-0075115, filed on Jun. 29, 2018 in the Korean Intellectual Property Office, the disclosure of which is incorporated herein by reference.

BACKGROUND OF THE DISCLOSURE

Field of the Disclosure

The present disclosure relates to wireless power transmission, and more particularly, to an apparatus for wirelessly transmitting power, after estimating the location of a receiver for receiving wireless power by monitoring reception power of the receiver, to the estimated location and a method thereof.

Description of the Related Art

Wireless power transmission systems include a wireless power transmission device for wirelessly transmitting electrical energy and a wireless power reception device for receiving electrical energy from the wireless power transmission device.

By using a wireless power transmission system, a battery of a mobile phone can be charged, for example, merely by placing the mobile phone on a charging pad without connecting the mobile phone to a separate charging connector.

A method of wirelessly transmitting electrical energy can be classified into a magnetic induction method, a magnetic resonance method, and an electromagnetic wave method according to the principle of transferring electrical energy.

A magnetic induction method is a method of transmitting electrical energy using a phenomenon wherein electricity is induced between a transmitter coil and a receiver coil.

A magnetic resonance method is a method of generating a magnetic field oscillating at a resonance frequency in a transmitter coil and intensively transmitting energy to a receiver coil designed to operate at the same resonance frequency.

An electromagnetic wave or microwave method is a method wherein an electromagnetic wave generated in a transmitter is received by a receiver using one or several antennas and the received electromagnetic wave is converted into electrical energy.

Meanwhile, wireless power transmission can be classified into flexibly coupled wireless power transfer technology (hereinafter referred to as "flexibly coupled technology") and tightly coupled wireless power transfer technology (hereinafter referred to as "tightly coupled technology") according to the magnetic resonant coupling form or strength of a transmitter coil and a receiver coil.

Here, in the case of the "flexibly coupled technology," magnetic resonant coupling may be formed between one transmitter resonator and a plurality of receiver resonators, whereby multiple concurrent charging is possible.

Here, the "tightly coupled technology" merely enables power transmission between one transmitter coil and one receiver coil (one-to-one power transmission).

Wireless power transmission systems can be applied to complex wireless channel environments such as homes, offices, airports, and trains.

In addition, wireless power transmission systems can be applied to an environment in which a wireless device/IoT device/wearable device is charged by synthesizing a three-dimensional beam pattern of an array antenna based on beacon positioning technology, etc. in a three-dimensional space.

Generally, since wireless power transmission requires reception of a certain level or more of power, it can be implemented in a relatively small space.

When a distance from an array antenna is 2×(antenna length)$^2$/wavelength or more, it is called far field. In this case, since transverse plane waves proceed well, reception power or transmission efficiency is decreased.

The location of a power reception apparatus for wireless power transmission should be primarily estimated.

However, location estimation using a Global Positioning System (GPS), beacon signals, etc. is not yet accurate.

Therefore, there is a need for a method of accurately estimating the location of a power reception apparatus and wirelessly transmitting power with high efficiency through electric wave concentration.

RELATED ART DOCUMENTS

Patent Documents

Korean Patent No. 10-1222768 entitled "Method of estimating location of terminal for wireless communication system"

Korean Patent No. 10-1341510 entitled "Method of beamforming magnetic energy for wireless power transmission and apparatus therefor"

Korean Patent Application Publication No. 10-2014-0012240 entitled "Method of controlling power for multiple beamforming in wireless communication system and apparatus therefor"

SUMMARY OF THE DISCLOSURE

Therefore, the present disclosure has been made in view of the above problems, and it is one object of the present disclosure to improve wireless power transmission efficiency by accurately confirming the location of a receiver and forming beams at the location.

It is another object of the present disclosure to reduce the interference to the human body and other devices by roughly calculating a phase of the receiver based on a reception power value of the receiver and accurately calculating the phase of the receiver through adjustment of a beam width.

It is another object of the present disclosure to accurately confirm the location of the receiver by performing 3D beamforming through horizontal and vertical beamforming.

It is another object of the present disclosure to roughly estimate a location of the receiver by controlling some antennas among a plurality of antennas that perform beamforming and to transmit wireless power to the estimated location by controlling the plurality of antennas.

It is yet another object of the present disclosure to roughly estimate the location of a receiver by controlling some antennas among a plurality of antennas that perform beamforming, thereby reducing power consumption.

In accordance with an aspect of the present disclosure, the above and other objects can be accomplished by the provision of an apparatus for wirelessly transmitting power including a beamformer configured to form beams with a first width and sequentially transmit the formed beams with the first width to different spaces that are physically separated from each other and at least partially overlap; a reception part configured to receive reception power values corresponding to the transmitted beams with the first width; a calculator configured to calculate a phase of the receiver using a plurality of high reception power values based on magnitudes of the received reception power values; and an estimator configured to estimate a location of the receiver based on the calculated receiver phase, wherein wireless power is transmitted to the estimated receiver location.

In accordance with an embodiment of the present disclosure, the beamformer may form beams with a second width narrower than the first width and, based on the estimated receiver location, transmits sequentially the formed beams with the second width to different spaces that are physically separated from each other and at least partially overlap.

In accordance with an embodiment of the present disclosure, the reception part may receive reception power values corresponding to the transmitted beams with the second width, the calculator may further calculate a phase of the receiver using a plurality of high reception power values based on magnitudes of the reception power values received by the second width, and the estimator may re-estimate the location of the receiver based on the receiver phase further calculated by the second width.

In accordance with an embodiment of the present disclosure, the calculator may determine first and second reception power values among the reception power values corresponding to the beams with the first width, may reflect the first reception power value on a first phase value related to the first reception power value, may reflect the second reception power value on a second phase value related to the second reception power value, may sum a value obtained by reflecting the first reception power value on the first phase value and a value obtained by reflecting the second reception power value on the second phase value, and may calculate a phase of the receiver based on a ratio of the first and second reception power values to the summed value.

In accordance with an embodiment of the present disclosure, the first reception power value may correspond to a highest reception power value among the reception power values corresponding to the beams with the first width, and the second reception power value may correspond to a second highest reception power value next to the first reception power value among the reception power values corresponding to the beams with the first width.

In accordance with an embodiment of the present disclosure, the estimator may estimate a location of the receiver in a direction between the beam corresponding to the first reception power value and the beam corresponding to the second reception power value based on the ratio of the first and second reception power values to the summed value.

In accordance with an embodiment of the present disclosure, the beamformer may receive Bluetooth beacon signals from the receiver, and then sequentially transmit the beams with the first width to the different spaces, and the reception part may receive feedback signals, related to the reception power values corresponding to the beams with the first width, through the Bluetooth beacon signals.

In accordance with an embodiment of the present disclosure, the beamformer may sequentially transmit the formed beams with the first width to separate locations of different spaces separated from each other based on horizontal and vertical axes, the reception part may receive reception power values corresponding to the transmitted beams with the first width, and the estimator may estimate a location of the receiver based on a ratio of three highest reception power values that are determined based on magnitudes of the received reception power values.

In accordance with an embodiment of the present disclosure, the beamformer may form beams with a second width narrower than the first width and, based on the estimated receiver location, transmit the formed beams with the second width to a location, separated from other spaces based on horizontal and vertical axes, of any one space among different spaces that are separated from each other based on the horizontal and vertical axes.

In accordance with an embodiment of the present disclosure, the reception part may receive reception power values corresponding to the transmitted beams with the second width, and the estimator may re-estimate the location of the receiver based on a ratio of three highest reception power values related to the second width, based on magnitudes of the reception power values received by the second width.

In accordance with an embodiment of the present disclosure, the beamformer may control some antennas among a plurality of antennas to form beams with the first width and control the plurality of antennas to form beams with the second width.

In accordance with another aspect of the present disclosure, there is provided a method of wirelessly transmitting power, the method including forming, by means of a beamformer, beams with a first width and sequentially transmitting the formed beams with the first width to different spaces that are physically separated from each other and at least partially overlap; receiving, by means of a reception part, reception power values corresponding to the transmitted beams with the first width; calculating, by means of a calculator, a phase of the receiver using a plurality of high reception power values based on magnitudes of the received reception power values; estimating, by means of an estimator, a location of the receiver based on the calculated receiver phase, and transmitting wireless power to the estimated receiver location.

In accordance with an embodiment of the present disclosure, the method may further include forming, by means of the beamformer, beams with a second width narrower than the first width and, based on the estimated receiver location, sequentially transmitting the formed beams with the second width to different spaces that are physically separated from each other and at least partially overlap; receiving, by means of the reception part, reception power values corresponding to the transmitted beams with the second width; calculating, by means of the calculator, a phase of the receiver using a plurality of high reception power values based on magnitudes of the reception power values received by the second width; and re-estimating, by means of the estimator, the location of the receiver based on the receiver phase calculated by the second width.

In accordance with an embodiment of the present disclosure, the calculating may further include determining first and second reception power values among the reception power values corresponding to the beams with the first width, reflecting the first reception power value on a first phase value related to the first reception power value, reflecting the second reception power value on a second phase value related to the second reception power value, summing a value obtained by reflecting the first reception power value on the first phase value and a value obtained by reflecting the second reception power value on the second phase value, and calculating a phase of the receiver based on a ratio of the first and second reception power values to the summed value.

In accordance with an embodiment of the present disclosure, the calculating may further include determining first and reception power values among the reception power values corresponding to the beams with the first width, reflecting the first reception power value on the first phase value related to the first reception power value, reflecting the second reception power value on the second phase value related to the second reception power value, summing a value obtained by reflecting the first reception power value on the first phase value and a value obtained by reflecting the second reception power value on the second phase value, and calculating a phase of the receiver based on a ratio of the first and second reception power values to the summed value.

In accordance with an embodiment of the present disclosure, the method may include sequentially transmitting, by means of the beamformer, the formed beams with the first width to separate locations of different spaces separated from each other based on horizontal and vertical axes; receiving, by means of the reception part, reception power values corresponding to the transmitted beams with the first width; estimating, by means of the estimator, a location of the receiver based on a ratio of three highest reception power values that are determined based on magnitudes of the received reception power values; forming, by means of the beamformer, beams with a second width narrower than the first width and, based on the estimated receiver location, transmitting the formed beams with the second width to a location, separated from other spaces based on horizontal and vertical axes, of any one space among different spaces that are separated from each other based on the horizontal and vertical axes; receiving, by means of the reception part, reception power values corresponding to the transmitted beams with the second width; and re-estimating, by means of the estimator, the location of the receiver based on a ratio of three highest reception power values related to the second width, based on magnitudes of the reception power values received by the second width.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIGS. 11A and 11B are views illustrating a beam formation manner of the microwave power transmitter illustrated in FIG. 10.

FIGS. 15 and 16 are views illustrating a method of wirelessly transmitting power according to an embodiment of the present disclosure;

FIG. 19 is a graph illustrating efficiency dependent upon the number of unit antennas turned on;

DETAILED DESCRIPTION OF THE DISCLOSURE

Embodiments of the present disclosure are described with reference to the accompanying drawings and the description thereof, but are not limited thereto.

The terminology used in the present disclosure serves the purpose of describing particular embodiments only and is not intended to limit the disclosure. As used in the disclosure and the appended claims, the singular forms "a", "an" and "the" are intended to include the plural forms as well, unless context clearly indicates otherwise. It will be further understood that the terms "includes" and/or "including," when used in this specification, specify the presence of stated features, steps, operations, elements, and/or components, but do not preclude the presence or addition of one or more other features, steps, operations, elements, components, and/or groups thereof.

It should not be understood that arbitrary aspects or designs disclosed in "embodiments", "examples", "aspects", etc. used in the specification are more satisfactory or advantageous than other aspects or designs.

In addition, the expression "or" means "inclusive or" rather than "exclusive or". That is, unless otherwise mentioned or clearly inferred from context, the expression "x uses a or b" means any one of natural inclusive permutations.

Further, as used in the description of the disclosure and the appended claims, the singular forms "a", "an" and "the" are intended to include the plural forms as well, unless context clearly indicates otherwise.

In addition, terms such as "first" and "second" are used in the specification and the claims merely to describe a variety of constituent elements, but the constituent elements are not limited by the terms. The terms are used only for the purpose of distinguishing one constituent element from another constituent element.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Meanwhile, in the following description of the present disclosure, a detailed description of known functions and configurations incorporated herein will be omitted when it may make the subject matter of the present disclosure unclear. The terms used in the specification are defined in consideration of functions used in the present disclosure, and can be changed according to the intent or conventionally used methods of clients, operators, and users. Accordingly, definitions of the terms should be understood on the basis of the entire description of the present specification.

Figure 1:
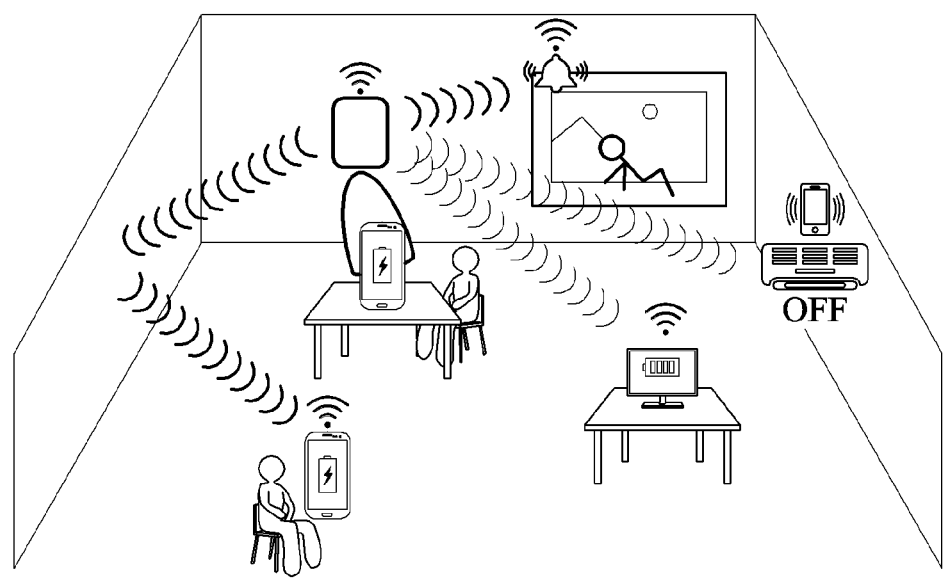
FIG. 1 is an exemplary diagram illustrating an environment where a wireless power transmission system is applied.

FIG. 1 is an exemplary diagram illustrating an environment where a wireless power transmission system is applied.

As illustrated in FIG. 1, a wireless power transmission environment may be a three-dimensional space such as a living room or a room in a home, an office, an airport, or a train.

Power transmission in a three-dimensional space may be performed by near-field wireless power transmission adopting a magnetic induction method or a magnetic resonance method. In addition, a microwave method capable of covering near and far distances depending upon the location and type of a power reception device may be used.

Meanwhile, a power reception device may be a communication device. The power reception device may be provided with an RF harvesting device capable of collecting energy from electromagnetic waves in a three-dimensional space.

Figure 2:
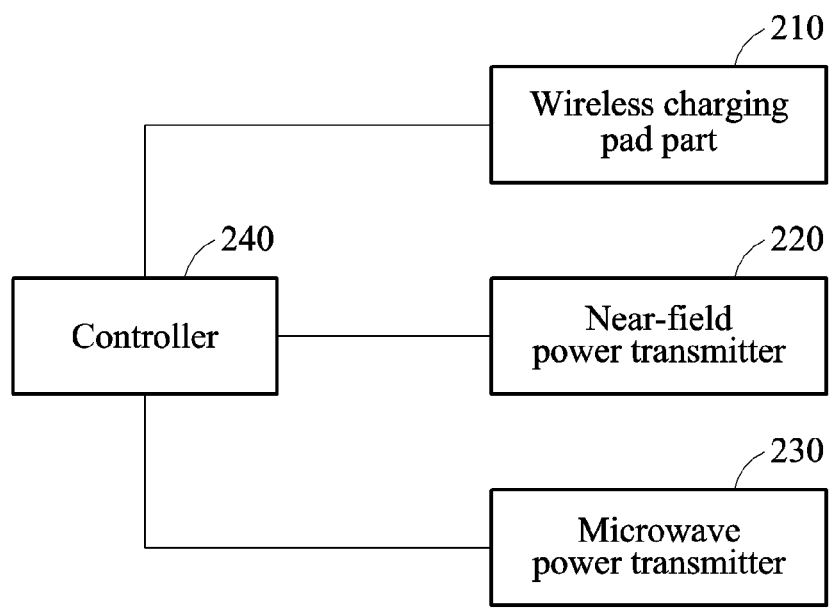
FIG. 2 is a view illustrating a wireless power transmission device capable of transmitting power in various manners in an environment as illustrated in FIG. 1.

FIG. 2 is a view illustrating a wireless power transmission device capable of transmitting power in various manners in an environment as illustrated in FIG. 1.

Referring to FIG. 1, the wireless power transmission device may include at least one of a wireless charging pad part 210, a near-field power transmitter 220, and a microwave power transmitter 230.

In other words, although all of the wireless charging pad part 210, the near-field power transmitter 220, and the microwave power transmitter 230 are illustrated in FIG. 2, a power transmission device using one power transmission manner may be merely provided depending upon a three-dimensional space environment.

Accordingly, in the following description, the wireless power transmission device or the power transmission device should be understood as including at least one of the wireless charging pad part 210, the near-field power transmitter 220, and the microwave power transmitter 230.

A controller 240 may control operation of at least one of the wireless charging pad part 210, the near-field power transmitter 220, and the microwave power transmitter 230.

The controller 240 may monitor a three-dimensional space environment and, based on the monitoring result, may control operation of at least one of the wireless charging pad part 210, the near-field power transmitter 220, and the microwave power transmitter 230.

For example, when long-distance transmission is unnecessary, the controller 240 may control the wireless charging pad part 210 and the near-field power transmitter 220 to operate and the microwave power transmitter 230 not to operate.

The wireless charging pad part 210 may transmit power by a magnetic induction method or a magnetic resonance method.

The near-field power transmitter 220 may transmit power to a three-dimensional space by a magnetic resonance method.

The microwave power transmitter 230 may transmit power to a three-dimensional space by a microwave power transmission method.

Meanwhile, "far field" may be defined as a case wherein a distance between a transmitting end and a receiving end is "$2\times(\text{antenna length})^2/\text{wavelength}$" or more.

Figure 3:
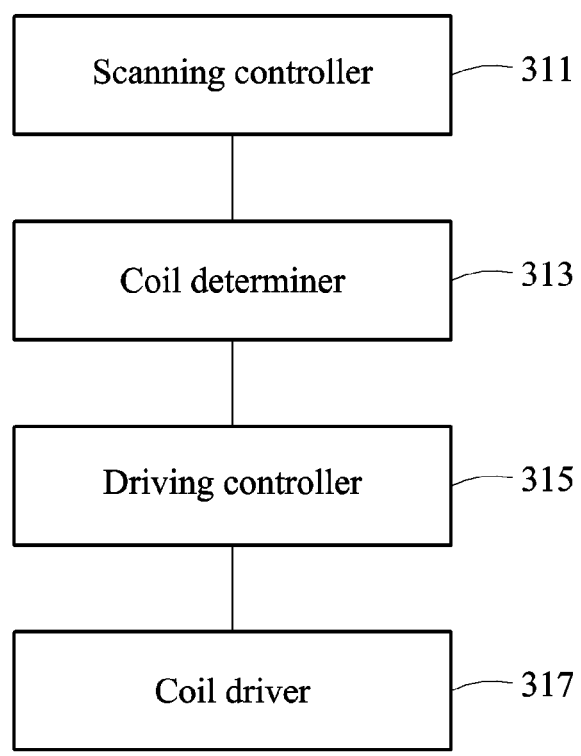
FIG. 3 is a view illustrating a configuration example of the wireless charging pad part of FIG. 2.

FIG. 3 is a view illustrating a configuration example of the wireless charging pad part of FIG. 2.

Figure 4:
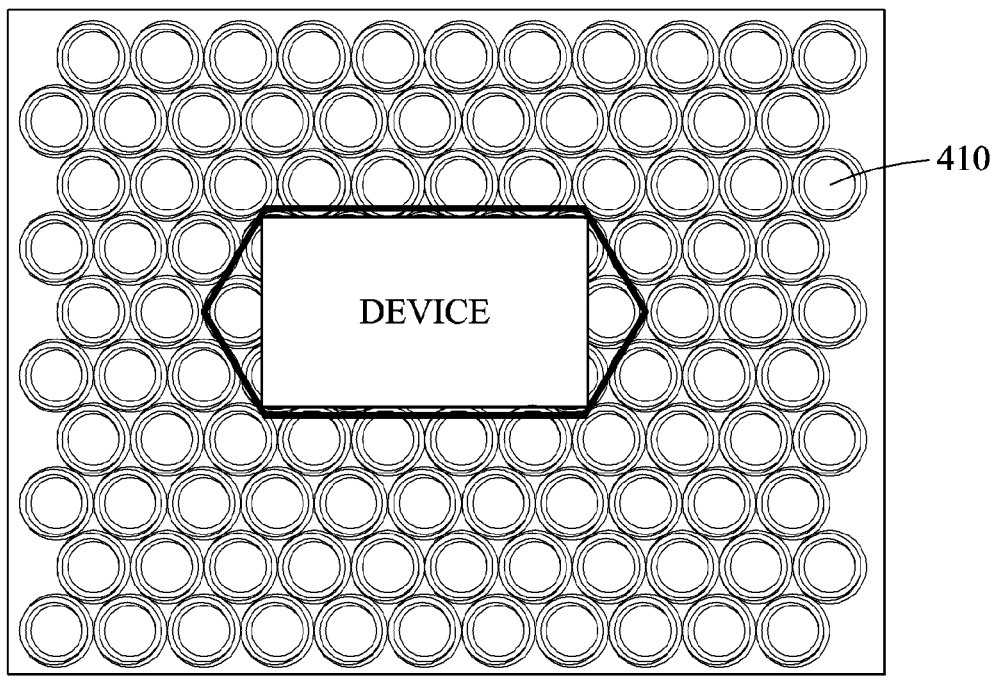
FIG. 4 is a view illustrating a configuration example of a wireless charging pad of a wireless charging pad part according to an embodiment of the present disclosure.

The device illustrated in FIG. 3 may include a wireless charging pad (not shown) and a device for driving the wireless charging pad. Here, the wireless charging pad may be configured as illustrated in FIG. 4.

The wireless charging pad-driving device may include a driving controller 315 and a coil driver 317. The wireless charging pad-driving device may further include a coil determiner 313 and a scanning controller 311.

The wireless charging pad-driving device according to an embodiment of the present disclosure may include the driving controller 315 configured to each independently control driving of a plurality of small power transmission coils constituting the wireless charging pad; and a plurality of driving modules configured to respectively drive the small power transmission coils according to a first or second control signal input by the driving controller 315.

The scanning controller 311 scans the wireless charging pad so as to detect a device to be charged on the wireless charging pad constituted of the small power transmission coils.

The scanning controller 311 may detect, using at least one of an impedance change and a pressure change in each of the small power transmission coils, whether a device to be charged is placed on the small power transmission coils.

The coil determiner 313 verifies power transmission coils to be driven, located under the device to be charged, among the small power transmission coils, and verifies power transmission coils surrounding the power transmission coils to be driven among the small power transmission coils.

The driving controller 315 may generate a first control signal to apply a first driving voltage having a first phase to the power transmission coils to be driven, and may generate a second control signal to apply a second driving voltage having a phase different from the first phase to the surrounding power transmission coils.

Here, the power transmission coils to be driven may be small power transmission coils matching a device to be charged. The expression "matching a device to be charged" may refer to a state wherein small power transmission coils are placed under or near a device to be charged to transmit power to the device to be charged.

Figure 6:
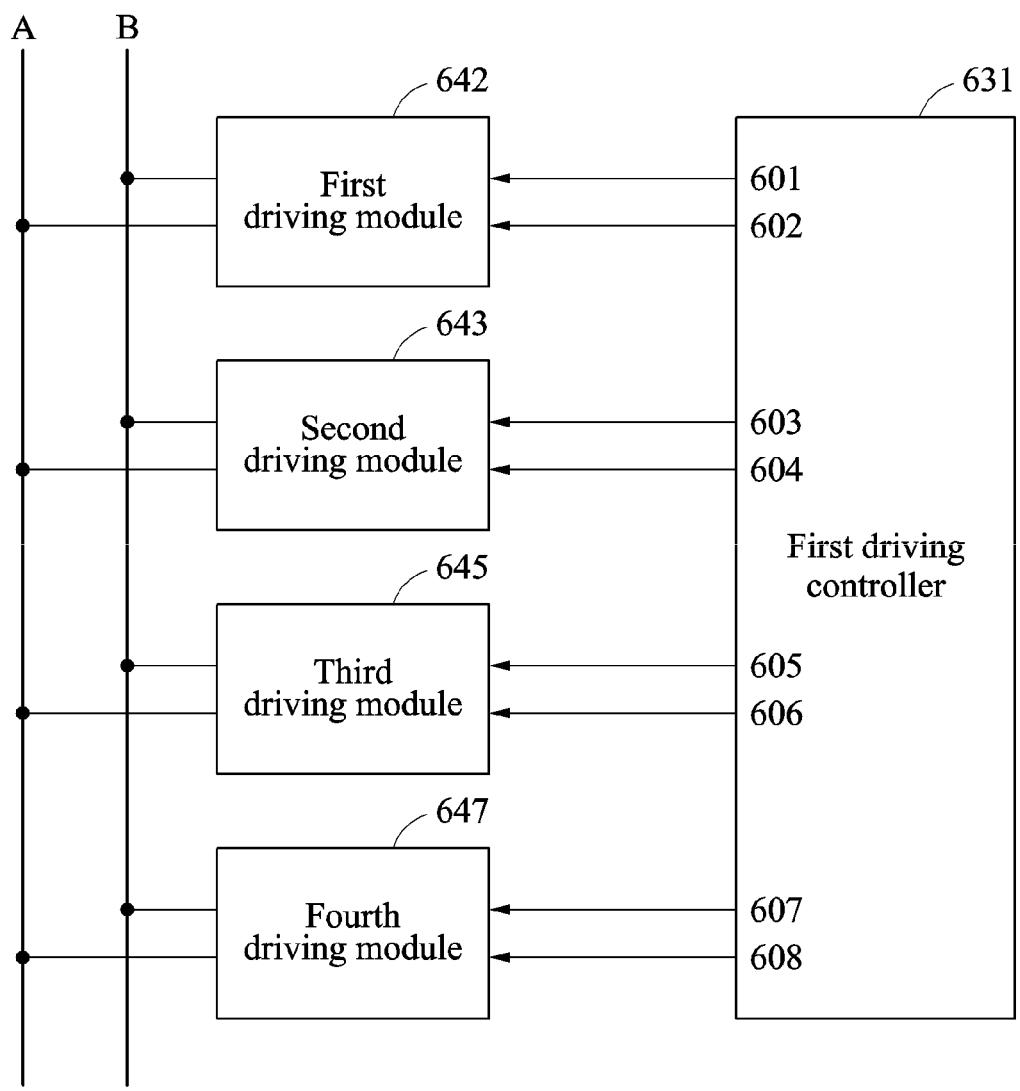
FIG. 6 is a view illustrating a configuration example of the driving controller and coil driver illustrated in FIG. 3.
Figure 7:
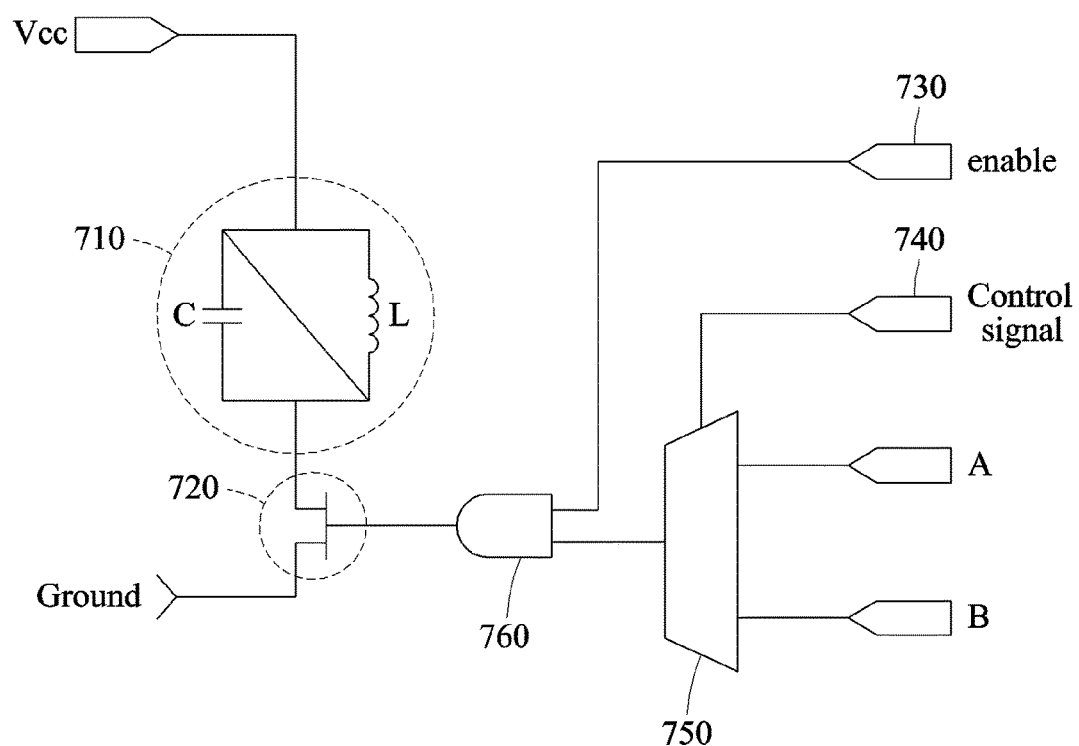
FIG. 7 is a view illustrating a configuration example of a coil driver and a connection between small power transmission coils and the coil driver, according to an embodiment of the present disclosure.

Here, the first control signal may be a "Select" signal controlling the coil driver 317 to select an "A" signal from the "A" signal and a "B" signal, which has a phase opposite to the "A" signal, illustrated in FIGS. 6 and 7.

In addition, the second control signal may be a "Select" signal controlling the coil driver 317 to select a "B" signal from the "A" signal and the "B" signal, which has a phase opposite to the "A" signal, illustrated in FIGS. 6 and 7.

The coil driver 317 applies the first and second driving signals to the wireless charging pad.

FIG. 4 is a view illustrating a configuration example of a wireless charging pad of a wireless charging pad part according to an embodiment of the present disclosure.

Referring to FIG. 4, a plurality of small power transmission coils 410 may be disposed in a tessellated structure, without overlapping each other, on the wireless charging pad.

Figure 5:
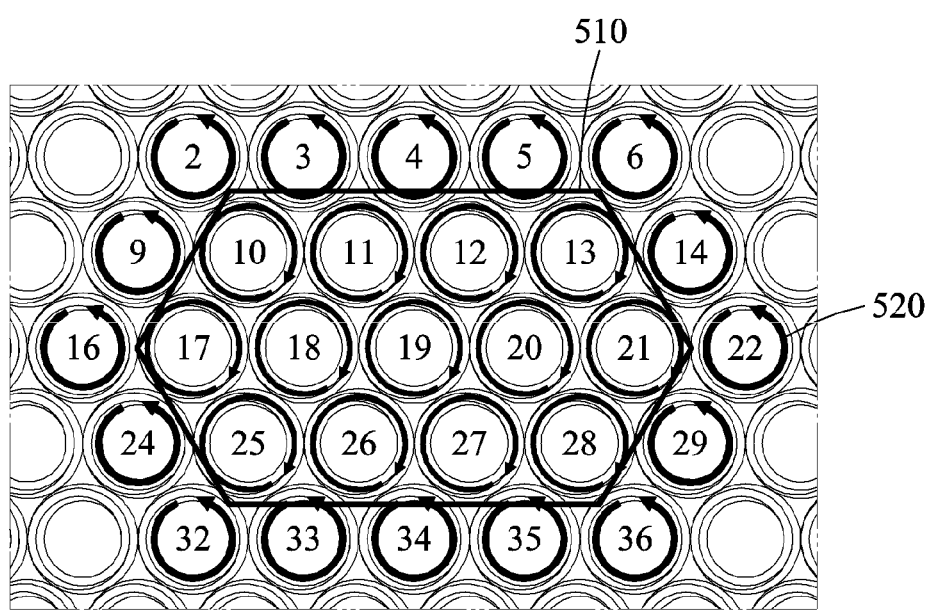
FIG. 5 is a view illustrating an operation example of the wireless charging pad illustrated in FIG. 4, on which a device to be charged is placed.

In addition, FIG. 5 illustrates "DEVICE," as an example of a device to be charged, placed on the wireless charging pad.

Here, it is possible to control to only operate small power transmission coils inside a hexagonal bold line inside which "DEVICE" is located, among a total of small power transmission coils.

FIG. 5 is a view illustrating an operation example of the wireless charging pad illustrated in FIG. 4, on which a device to be charged is placed.

Referring to FIGS. 3 and 5, the scanning controller 311 may detect whether a device to be charged is placed on corresponding small power transmission coils, using at least one of an impedance change and a pressure change in each of the small power transmission coils.

For example, upon scanning using an impedance change, a device to be charged may be determined that it has been placed on corresponding coils when an impedance change in the coils is outside a preset range.

In addition, when the small power transmission coils are respectively provided with pressure sensors, the pressure sensors may detect whether a device to be charged is placed on the pressure sensors, through pressure change.

The scanning controller 311 may detect whether a device to be charged is placed on coils 10, 11, 12, 13, 17, 18, 19, 20, 21, 25, 26, 27, and 28 by scanning the wireless charging pad.

When coils under a position at which a device to be charged is placed are detected as coils 10, 11, 12, 13, 17, 18, 19, 20, 21, 25, 26, 27, and 28, as a result of scanning by the scanning controller 311, the coil determiner 520 may verify that each of the coils 10, 11, 12, 13, 17, 18, 19, 20, 21, 25, 26, 27, and 28 is a power transmission coil to be driven.

In addition, the coil determiner 313 may verify coils 2, 3, 4, 5, 6, 9, 14, 16, 22, 24, 29, 32, 33, 34, 35, and 36, among the small power transmission coils, as coils surrounding the power transmission coils to be driven 10, 11, 12, 13, 17, 18, 19, 20, 21, 25, 26, 27, and 28.

In the embodiment illustrated in FIG. 5, clockwise arrows indicate a first phase, and counterclockwise arrows indicate a second phase.

The coil driver 317 may output the first driving signal to corresponding small power transmission coils upon receiving input of a first control signal, and may output the second driving signal to corresponding small power transmission coils upon receiving input of a second control signal.

For example, the coil driver 317 may output the first driving signal to each of power transmission coils to be driven 10, 11, 12, 13, 17, 18, 19, 20, 21, 25, 26, 27, and 28, and may output the second driving signal to each of surrounding power transmission coils 2, 3, 4, 5, 6, 9, 14, 16, 22, 24, 29, 32, 33, 34, 35, and 36.

By operating coils under a position, at which a device to be charged is located, in this manner, power may be transmitted to the device to be charged. In addition, by operating coils near the coils, which are under a position at which the device to be charged is located, to have an opposite phase, magnetic force lines toward the device to be charged may increase, but magnetic force lines spreading to the outside may be reduced.

Accordingly, even when power transmitted to the device to be charged is increased, power transmission efficiency may be maintained and influence of magnetic field lines on the outside may be reduced.

FIG. 6 is a view illustrating a configuration example of the driving controller and coil driver illustrated in FIG. 3.

FIG. 6 illustrates an embodiment wherein one driving controller (a first driving controller, 631) controls four driving modules 642, 643, 645, and 647.

Although not illustrated in FIG. 6, a plurality of driving controllers, such as second and third driving controllers, other than the first driving controller 631 may be provided.

Here, the first driving controller 631 may be a shift register having eight output signal terminals 601 to 608.

Accordingly, when first driving controllers 631, as shift registers, are connected in a cascade form, circuits for individually driving small power transmission coils may be linearly extended.

The driving modules 642, 643, 645, and 647 may be respectively connected to the small power transmission coils.

For example, the first driving module 642 may be connected to a first small power transmission coil, the second driving module 643 may be connected to a second small power transmission coil, the third driving module 645 may be connected to a third small power transmission coil, and the fourth driving module 647 may be connected to a fourth small power transmission coil.

Accordingly, when the wireless charging pad is provided with 36 small power transmission coils, the wireless charging pad may include 36 driving modules and 9 driving controllers.

Accordingly, a driving device for the wireless charging pad according to an embodiment of the present disclosure may include a first driving controller configured to each independently control driving of small power transmission coils constituting a first wireless charging module; and a second driving controller configured to each independently control driving of a plurality of small power transmission coils constituting a second wireless charging module.

Here, an end of the second driving controller may be connected to the first driving controller, and another end of the second driving controller may be connected to a third driving controller, thereby supporting expansion of the wireless charging modules.

Referring to FIG. 6 again, the coil driver includes the driving modules 642, 643, 645, and 647 respectively connected to the small power transmission coils.

In addition, the coil driver may include two bus lines that respectively apply a first switching signal A having the first phase and a second switching signal B having the second phase to the driving modules 642, 643, 645, and 647.

The first driving controller 631 applies an enable signal and a first or second control signal, which control a corresponding driving module to operate, to each of the driving modules.

The first driving controller 631 may apply an enable signal to driving modules respectively connected to the power transmission coils to be driven and the surrounding power transmission coils, and may apply the first or second control signal to the driving modules to which the enable signal is applied.

For example, when the first driving module 642 is a driving module connected to a power transmission coil to be driven, the enable signal may be output to a terminal 601, and the first control signal may be output to a terminal 602.

For example, when the fourth driving module 647 is a driving module connected to a surrounding power transmission coil, the enable signal may be output to a terminal 607, and the second control signal may be output to a terminal 608.

FIG. 7 is a view illustrating a configuration example of a coil driver and a connection between small power transmission coils and the coil driver, according to an embodiment of the present disclosure.

Referring to FIG. 7, reference numeral 710 denotes an equivalent circuit of one small power transmission coil.

One end of the small power transmission coil 710 may be connected to a driving voltage Vcc, and another end thereof may be connected to a switching element 720 provided in the coil driver.

Here, the coil driver may include the switching element 720 connected to the small power transmission coil 710; a multiplexer 750; and an AND gate element 760.

The coil driver may receive input of an enable signal through a terminal 730 and may receive input of a control signal through a terminal 740.

Here, the multiplexer 750 may output the first switching signal A when a control signal, which is input through the terminal 740, is a first control signal, and may output the second switching signal B when a control signal, which is input through the terminal 740, is a second control signal.

The AND gate element 760 may receive input of the enable signal, which is input through the terminal 730, and an output signal of the multiplexer 750 to control the switching element 720.

For example, when the small power transmission coil 710 is a power transmission coil to be driven, the first control signal may be input to the terminal 740, and the switching element 720 may be turned on/off by a switching signal such as signal A shown in FIG. 11.

The driving voltage Vcc is applied to the small power transmission coil 710 according to on/off of the switching element 720, so that the small power transmission coil 710 operates as a first driving voltage having a first phase.

For example, when the switching element 720 is an NMOS transistor, a capacitor of the small power transmission coil 710 is charged in a time period in which the NMOS transistor is turned on, and is discharged in a time period in which the NMOS transistor is turned off. The magnetic field of an inductor may be controlled through repetition of such charge and discharge.

Figure 8:
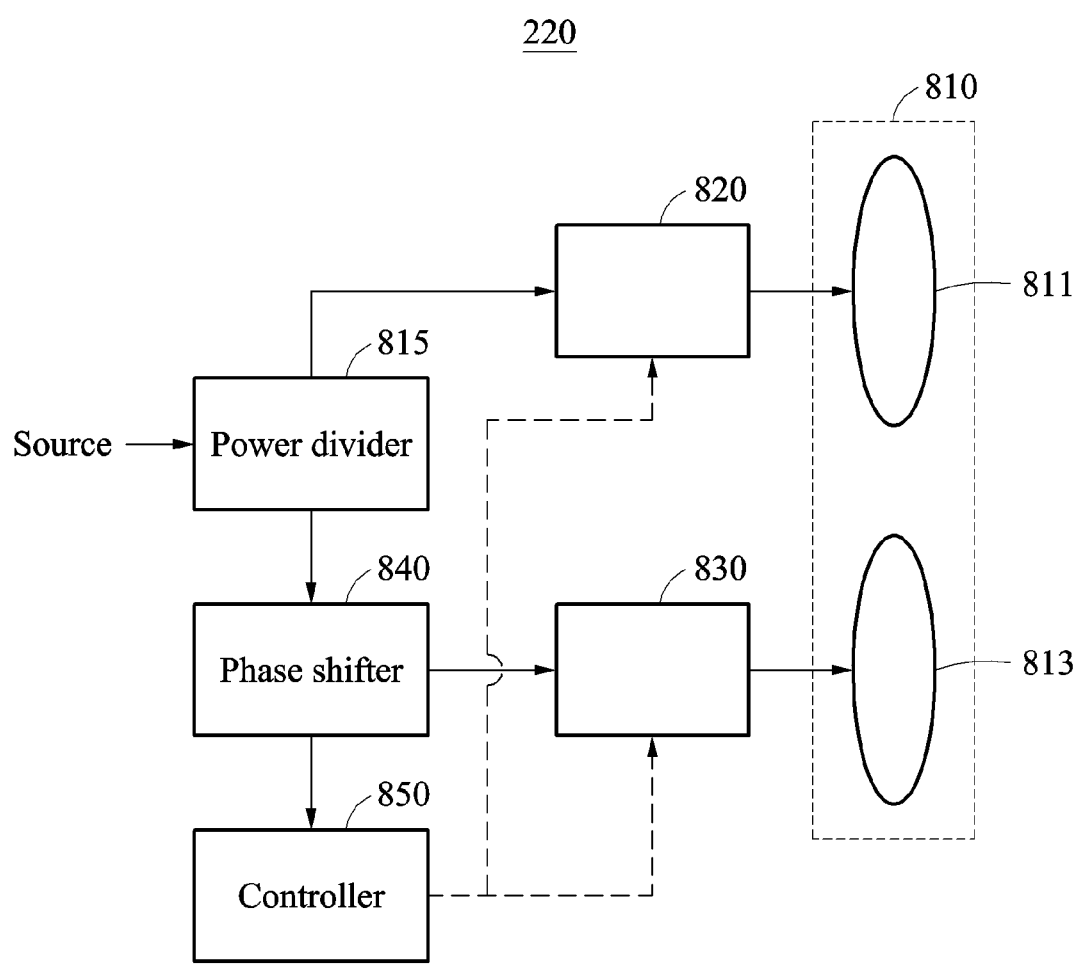
FIG. 8 is a view illustrating another configuration example of the near-field power transmitter of FIG. 2.

FIG. 8 is a view illustrating another configuration example of the near-field power transmitter of FIG. 2.

Referring to FIG. 8, the near-field power transmitter may include a coil part 810 including a plurality of power transmission coils; a power divider 815; a first amplifier 820; a second amplifier 830; a phase shifter 840; and a controller 850.

The coil part 810 transmits wireless power to a reception coil using a magnetic resonance method.

For example, the coil part 810 may include two magnetic resonance coils 811 and 813.

The first and second magnetic resonance coils 811 and 813 may respectively form magnetic coupling with a single reception coil, thereby wirelessly transmitting power.

Such an environment constituted of a plurality of transmission coils and a single reception coil may be referred to as a Multiple Input Single Output (MISO) system.

Meanwhile, an environment constituted of a single transmission coil or a single transmitter and a single reception apparatus may be referred to as a Single Input Single Output (SISO) system.

The MISO system may more efficiently transmit power and exhibit superior performance even in an environment in which a power reception apparatus moves, compared to the SISO system.

However, also in the MISO system, magnetic coupling may be greatly affected according to an arranged state of transmission coils and a reception coil.

When phases of currents supplied to the first magnetic resonance coil 811 and the second magnetic resonance coil 813 are differently controlled, magnetic coupling may be formed without being greatly affected by an arrangement state of the transmission coils and the reception coil.

The power divider 815 may divide power supplied from a power source and may output the divided power to the first amplifier 820 and the phase shifter 840.

The phase shifter 840 may change a phase of input power.

The phase shifter 840 may adjust a phase of a current supplied to the second amplifier 830 by adjusting the phase of the input current.

Accordingly, phases of currents supplied to the first magnetic resonance coil 811 and the second magnetic resonance coil 813 may be differently adjusted.

For example, a difference between phases of currents supplied to the first magnetic resonance coil 811 and the second magnetic resonance coil 813 may be set to 0 to 180 degrees.

Through such phase control, an efficiency decrease problem caused by movement of a receiver in the MISO system may be addressed.

Figure 9:
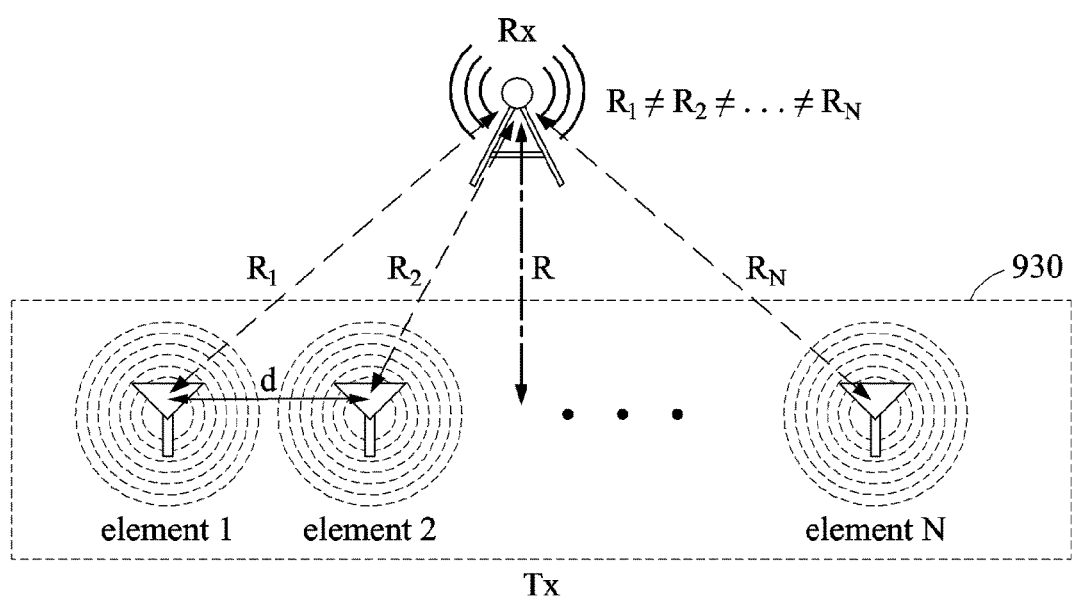
FIG. 9 is a view illustrating the configuration and operation environment of the microwave power transmitter of FIG. 2.

FIG. 9 is a view illustrating the configuration and operation environment of the microwave power transmitter of FIG. 2.

Referring to FIG. 9, the microwave power transmitter may include an array antenna part 930 including a plurality of antenna elements (element 1, element 2, element N).

The array antenna part 930 may adjust radiation characteristics by controlling a phase and the magnitude of distribution current of each of the antenna elements.

Here, reception power may be maximized by adjusting a feeding phase of each radiation element so that the electric field is added in the same phase at a position of a reception antenna.

In general, a distance between an array antenna and a reception antenna is assumed to be very far. Accordingly, power transmission efficiency between the antennas may be calculated by applying the Friis formula represented by Equation 1, after assuming that a distance between each of the antenna elements of the array antenna and the reception antenna is equal:

$$\eta = \frac{P_r}{P_t} = \frac{G_t G_r}{\left(\frac{4\pi R}{\lambda}\right)^2} \qquad \text{[Equation 1]}$$

wherein $P_r$ denotes reception power, $P_t$ denotes transmission power, R denotes a distance between the transmission antenna and the reception antenna, $G_t$ denotes a gain of the transmission antenna, and $G_r$ denotes a gain of the reception antenna.

However, the general Friis formula might not be applied to an environment for near-field or intermediate-field wireless power transmission because a distance between each of the antenna elements of the array antenna and the reception antenna is different in the environment.

Accordingly, the controller 240 or the microwave power transmitter 230 of FIG. 2 calculates power transmission efficiency in consideration of an environment for actual wireless power transmission.

The controller 240 or the microwave power transmitter 230 of FIG. 2 may receive information on reception power through communication with the power reception apparatus, and may calculate power transmission efficiency based on Equation 2 below. In addition, the controller 240 may calculate power transmission efficiency from a near distance to a far distance based on Equation 2.

That is, when input power magnitudes of transmission radiation elements are respectively $P_1, P_2, \ldots, P_N$, distances between the reception antenna and the radiation elements are respectively $R_1, R_2, \ldots, R_N$, the radiation elements have the same gain, i.e., $G_{r0}$, and an antenna gain is $G_r$, a power efficiency transmitted to the reception antenna may be represented by $$\eta = \frac{P_{rec}}{P_{in}} = \frac{G_{r_0} G_r}{\sum_{i=1}^{N} P_i} \left(\frac{\lambda_0}{4\pi}\right)^2 \left(\sum_{i=1}^{N} \frac{\sqrt{P_i}}{R_i}\right)^2 \qquad \text{[Equation 2]}$$

wherein an average distance between a radiation element at a transmission end and a reception antenna may be defined by Equation 3. In addition, a power transmission efficiency calculation method according to an embodiment of the present disclosure may be represented by Equation 4:

$$R_{mean} = \frac{N}{\frac{1}{R_1} + \frac{1}{R_2} + \cdots \frac{1}{R_N}}, \left(R_{shortest} < R_{mean} < \frac{\sum_{i=1}^{N} R_i}{N}\right) \qquad \text{[Equation 3]}$$

$$\eta = \frac{P_r}{P_t} = \frac{G_t G_r}{\left(\frac{4\pi R_{mean}}{\lambda}\right)^2} \qquad \text{[Equation 4]}$$

Figure 10:
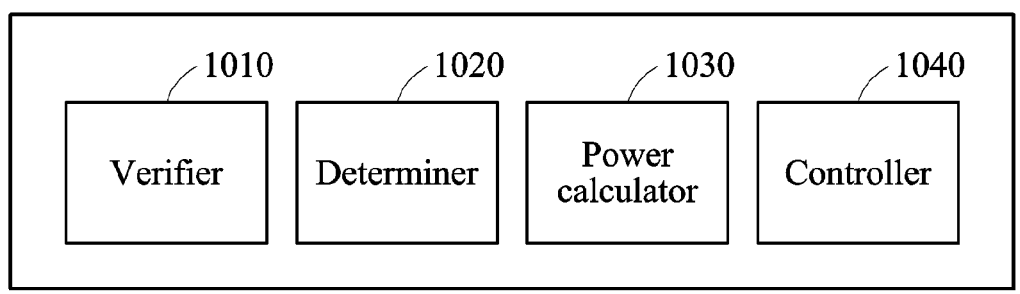
FIG. 10 is a view illustrating another configuration example of the microwave power transmitter of FIG. 2.

FIG. 10 is a view illustrating another configuration example of the microwave power transmitter of FIG. 2.

The microwave power transmitter illustrated in FIG. 10 may control multi-beam formation using an array antenna (not shown).

A verifier 1010 verifies information on a radiation pattern of an array antenna through full-wave simulation. For example, for full-wave simulation, a High Frequency Structure Simulator (HFSS) may be used.

The verifier 1010 verifies a radiation pattern of each of single antennas constituting the array antenna. The radiation pattern may be a radiation pattern modified by interference between an arranged position of the array antenna and surrounding single antennas.

The verifier 1010 calculates an average value of radiation patterns of the single antennas constituting the verified array antenna to generate information on a radiation pattern of the array antenna.

The verifier 1010 may only verify a radiation pattern of at least one of the single antennas constituting the array antenna.

Information on a radiation pattern of the array antenna may be a radiation pattern value of any one single antenna constituting the array antenna, an average value of at least two antennas of the single antennas constituting the array antenna, or an average value of a total of the single antennas constituting the array antenna.

The verifier 1010 may verify information on radiation characteristics of the array antenna before verifying information on a radiation pattern of the array antenna.

The information on the radiation characteristics may include information on the number of main beams, a beam width, a null section, a steering angle, a steering range, an interval between single antennas, etc.

For example, when a user requires formation of three main beams, information on the three main beam formation may be included.

The verifier 1010 may receive input of information on the radiation characteristics from a user through an input device connected to the multi-beam formation control device according to an embodiment of the present disclosure.

The verifier 1010 may verify radiation patterns of the single antennas through full-wave simulation based on information on the radiation characteristics of the array antenna.

A determiner 1020 determines an Array Factor (AF) based on information on the radiation pattern (AEP).

The AF may be determined to have an optimal gain and steering performance.

The AF is the reciprocal of the information on the radiation pattern (AEP).

The AF may be expressed by Equation 5 below when the array antenna is constituted of N single antennas:

$$AF(\psi) = \sum_{n=1}^{N} \frac{A_n e^{-j(n-1)\psi}}{AEP(\theta)}, (\psi = \beta d \sin\theta) \qquad \text{[Equation 5]}$$

wherein $A_n$ denotes the amplitude of an $n^{th}$ single antenna, AEP denotes information on a radiation pattern, θ denotes a steering angle, d denotes an interval between single antennas, β denotes a propagation constant, and ψ denotes a phase difference between adjacent single antennas.

A power calculator 1030 may calculate the amplitude and phase of each of the single antennas constituting the array antenna based on an AF.

The amplitude ($A_n$) and the phase ($\varnothing_n$) of each of the single antennas constituting the array antenna may be calculated according to Equation 6 below:

$$A_n e^{j\varnothing_n} = \frac{1}{2\pi} \int_{-\pi}^{\pi} AF(\psi) e^{-jn\psi} d\psi, (\psi = \beta d \sin\theta) \qquad \text{[Equation 6]}$$

wherein AF denotes an array factor, AEP denotes information on a radiation pattern, θ denotes a steering angle, n denotes the index of a single antenna, d denotes an interval between single antennas, β denotes a propagation constant, $A_n$ denotes the amplitude of an $n^{th}$ single antenna, $ø_n$ denotes the phase of an $n^{th}$ single antenna, and ψ denotes a phase difference between adjacent single antennas.

The controller 1040 respectively controls the single antennas based on the calculated respective amplitudes ($A_n$) and phases ($ø_n$).

The controller 1040 respectively controls the single antennas such that the calculated amplitudes ($A_n$) and phases ($ø_n$) are respectively input.

Accordingly, the multi-beam formation control device according to an embodiment of the present disclosure may minimize an error and more precisely form various beam shapes by calculating and controlling the amplitude and the phase of each of the single antennas using an AF in which an AEP is considered.

In addition, a gain may be improved upon steering and multi-beam formation that directly influence power transmission efficiency in wireless microwave power transmission.

This indicates that not only power transmission efficiency in wireless microwave power transmission may be improved but also a simultaneous charging and avoidance technique of multiple equipment may be improved.

Figure 11B:
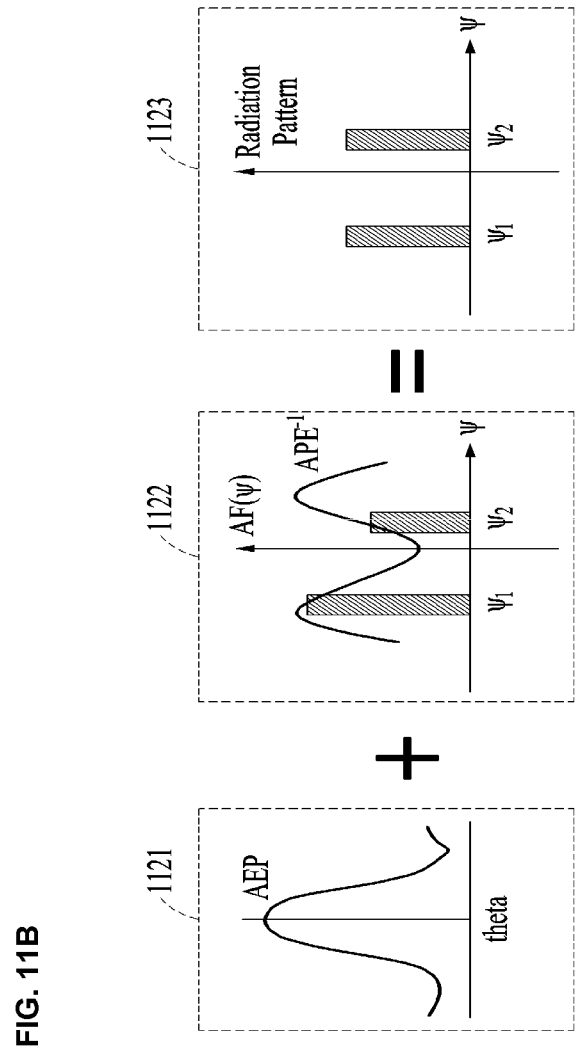

FIGS. 11A and 11B are views illustrating a beam formation manner of the microwave power transmitter illustrated in FIG. 10.

FIG. 11A illustrates a beam formation manner according to a conventional technology, and FIG. 11B illustrates a beam formation manner according to an embodiment of the present disclosure.

Referring to FIGS. 11A and 11B, a radiation pattern of an array antenna is obtained by multiplying information on a radiation pattern (AEP) by an array factor (AF).

Here, the radiation pattern refers to a radiation pattern of the entire array antenna wherein respective radiation patterns of the single antennas are combined.

In a conventional technology, a radiation pattern 1113 is calculated by multiplying an AEP 1111 by an AF 1112. In this case, since a radiation pattern modified by interference between an arranged position of the array antenna and surrounding single antennas is not considered, a gain may be reduced and an error in a beam steering angle may occur.

However, in a method according to an embodiment of the present disclosure, a radiation pattern 1123 is calculated by multiplying an AF 1122, which has been obtained by multiplying AF by the reciprocal of an AEP, by an AEP 1121.

In this case, it can be confirmed that values are the same in two steering angles ($ψ_1$, $ψ_2$) and multiple beams may be formed.

As such, multiple beams having an improved gain may be formed at a desired steering angle.

Figure 12:
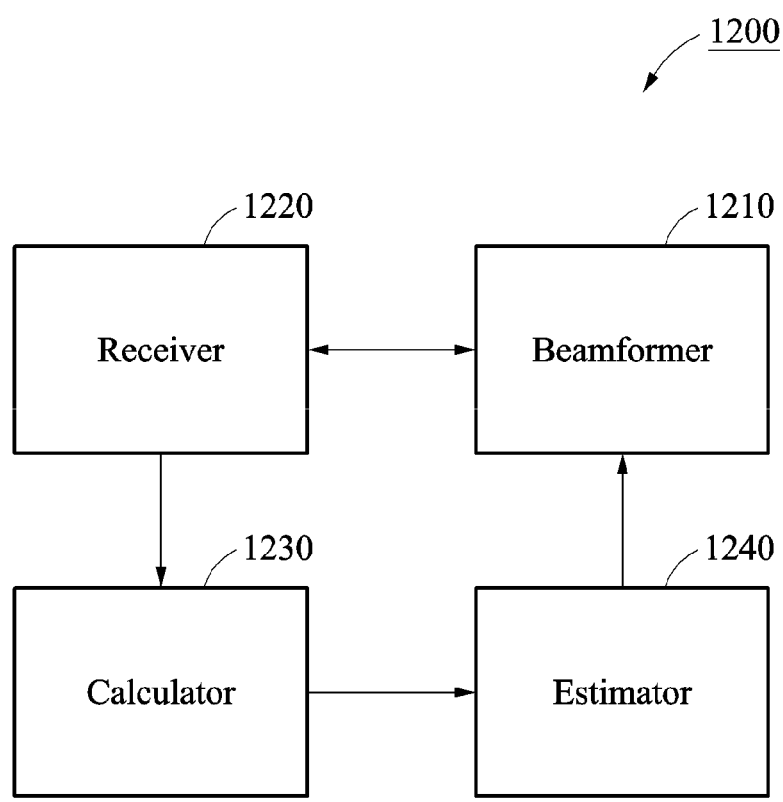
FIG. 12 is a view illustrating components of a wireless power transmission apparatus according to an embodiment of the present disclosure.

FIG. 12 is a view illustrating components of a wireless power transmission apparatus according to an embodiment of the present disclosure.

Referring to FIG. 12, a wireless power transmission apparatus 1200 includes a beamformer 1210, a reception part 1220, a calculator 1230, and an estimator 1240.

In accordance with an embodiment of the present disclosure, the beamformer 1210 may form beams with a first width and sequentially transmit the beams with the first width to different spaces that are physically separated from each other and at least partially overlap.

For example, the different spaces may be located in the front of the beamformer 1210 and correspond to spaces to which the beams with the first width may be transmitted.

For example, the beamformer 1210 may form beams with a second width narrower than the first width and sequentially transmit the beams with the second width to different spaces that are physically separated from each other and at least partially overlap based on an estimated receiver location.

For example, the beamformer 1210 may, based on a roughly estimated receiver location, transmit the beams with the second width, narrower than the first width, to around the location of the receiver.

For example, the receiver may also be referred to as a wireless power reception apparatus.

In addition, the beamformer 1210 may form beams with the first width or beams with the second width by controlling a plurality of antennas.

Accordingly, the present disclosure may roughly estimate the location of the receiver by controlling some antennas among a plurality of antennas performing beamforming, thereby reducing power consumption.

In accordance with an embodiment of the present disclosure, the beamformer 1210 may form beams with the first width by controlling some antennas among the plurality of antennas and form beams with the second width by controlling all of the plurality of antennas.

In accordance with an embodiment of the present disclosure, the beamformer 1210 may receive Bluetooth beacon signals from the receiver, and then sequentially transmit beams with the first width to different spaces.

Here, the different spaces may, based on the width of the beams with the first width, be physically separated from each other and partially overlap both side spaces of each thereof.

For example, the beamformer 1210 may sequentially transmit beams with the first width to separate locations of different spaces that are separated from each other based on horizontal and vertical axes.

For example, the separate locations may correspond to, when a certain space is quadrisected based on horizontal and vertical axes, contact points of the quadrisected lines.

In accordance with an embodiment of the present disclosure, the beamformer 1210 may form beams with a second width narrower than the first width and, based on the estimated receiver location, transmit the beams with the second width to a location, separated from other spaces based on horizontal and vertical axes, of any one space among different spaces that are separated from each other based on the horizontal and vertical axes.

That is, the beamformer 1210 may transmit the beams with the second width to further subdivided locations, compared to when the beams with the first width are transmitted.

In accordance with an embodiment of the present disclosure, the reception part 1220 may receive reception power values corresponding to the beams with the first width.

In addition, the reception part 1220 may receive reception power values received by the second width. Here, the reception power values received by the second width may include reception power values measured by the receiver when the receiver receives the beams with the second width.

In accordance with an embodiment of the present disclosure, the reception part 1220 may receive Bluetooth beacon signals from the receiver.

For example, a receiver may advertise wireless power charge request signals using the Bluetooth beacon signals.

Accordingly, after the reception part 1220 receives the wireless power charge request signals, the beamformer 1210 may transmit the beams with the first width to a rough location of the receiver.

In addition, the reception part 1220 may receive feedback signals, related to the reception power values corresponding to the beams with the first width, through the Bluetooth beacon signals.

In accordance with an embodiment of the present disclosure, the calculator 1230 may calculate a phase of the receiver, using a plurality of reception power values, based on magnitudes of the received reception power values.

For example, the calculator 1230 may further calculate a phase of the receiver, using a plurality of reception power values, based on magnitudes of the reception power values received by the second width.

In accordance with an embodiment of the present disclosure, the calculator 1230 may calculate a phase of the receiver using Equation 7:

$$X = \frac{(A \times B) + (C \times D)}{B + D} \quad \text{[Equation 7]}$$

wherein X denotes a phase of the receiver, A denotes a first phase value related to a first reception power value, B denotes the first reception power value, C denotes a second phase value related to a second reception power value, and D denotes the second reception power value.

In accordance with an embodiment of the present disclosure, the calculator 1230 may determine first and second reception power values among the reception power values corresponding to the beams with the first width.

In addition, the calculator 1230 may reflect the first reception power value on the first phase value related to the first reception power value and reflect the second reception power value on the second phase value related to the second reception power value.

In addition, the calculator 1230 may calculate a phase of the receiver based on a ratio of the sum of a value obtained by reflecting the first reception power value on the first phase value and a value obtained by reflecting the second reception power value on the second phase value to the sum of the first reception power value and the second reception power value.

For example, the first phase value may include a phase value of an antenna that forms a beam with the first width corresponding to the first reception power value.

In addition, the second phase value may include a phase value of an antenna that forms a beam with the first width corresponding to the second reception power value.

For example, the first reception power value may correspond to a highest reception power value among the reception power values corresponding to the beams with the first width.

In addition, the second reception power value may correspond to a second highest reception power value next to the first reception power value among the reception power values corresponding to the beams with the first width.

In accordance with an embodiment of the present disclosure, the estimator 1240 may estimate the location of the receiver based on the phase of the receiver.

For example, the estimator 1240 may re-estimate the location of the receiver based on the phase of the receiver which is further calculated by the second width.

Accordingly, the present disclosure may accurately confirm the location of the receiver and form beams at the location, thereby improving wireless power transmission efficiency.

In addition, the present disclosure may roughly calculate a phase of the receiver based on the reception power value of the receiver and accurately calculate the phase of the receiver by adjusting a beam width, thereby reducing interference to the human body and other devices.

In accordance with an embodiment of the present disclosure, the estimator 1240 may estimate the location of the receiver in a direction between a beam corresponding to the first reception power value and a beam corresponding to the second reception power value based on a ratio of the first reception power value to the second reception power value.

For example, the estimator 1240 may estimate the location of the receiver based on a ratio of three highest reception power values that are determined based on magnitudes of received reception power values.

In accordance with an embodiment of the present disclosure, the estimator 1240 may re-estimate the location of the receiver based on a ratio of three highest reception power values, related to the second width, to magnitudes of the reception power values received by the second width.

The wireless power transmission apparatus 1200 may repeatedly estimate the location of the receiver while forming a beam with a narrower width until it accurately recognizes the location of the receiver.

In accordance with an embodiment of the present disclosure, the wireless power transmission apparatus may transmit wireless power to the receiver by concentrating wireless power on a phase of each of antennas corresponding to an estimated receiver location.

Figure 13A:
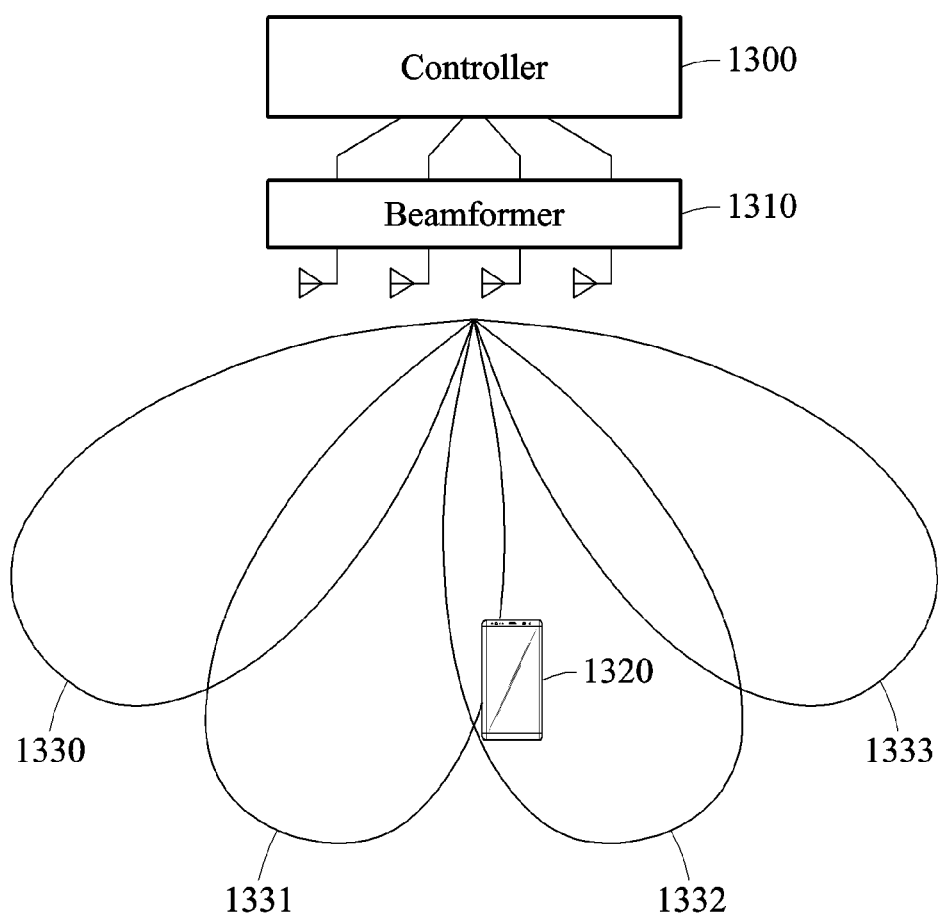
FIG. 13A is a view illustrating an operation wherein a wireless power transmission apparatus according to an embodiment of the present disclosure estimates the location of a receiver by transmitting beams with a first width.

FIG. 13A is a view illustrating an operation wherein a wireless power transmission apparatus according to an embodiment of the present disclosure estimates the location of a receiver by transmitting beams with a first width.

Referring to FIG. 13A, a controller 1300 serves to control antennas of a beamformer 1310 to form beams with the first width and sequentially transmit the beams with the first width such that portions of the beams overlap.

In accordance with an embodiment of the present disclosure, the controller 1300 may serve to control some of antennas of the beamformer 1310 to sequentially form beams with the first width.

For example, the beamformer 1310 may sequentially transmit first-width beams 1330 to 1333.

That is, the beamformer 1310 may transmit first-width beams 1330, 1331, 1332, and 1333.

In accordance with an embodiment of the present disclosure, the controller 1300 may serve to control a reception part (not shown) to receive a reception power value corresponding to the first-width beam 1331 and a reception power value corresponding to the first-width beam 1332 from a receiver 1320 via feedback signals.

For example, the controller 1300 may determine that the receiver is not located in a region corresponding to the first-width beam 1330 when feedback signals of the first-width beam 1330 are not received for a certain time after transmitting the first-width beam 1330.

Meanwhile, the controller 1300 may roughly calculate a phase of the receiver 1320 using the reception power value corresponding to the first-width beam 1331 and the reception power value corresponding to the first-width beam 1332.

In accordance with an embodiment of the present disclosure, the controller 1300 may roughly estimate the location of the receiver in a direction of about 5:10 between the first-width beam 1331 and the first-width beam 1332 when the reception power value corresponding to the first-width beam 1331 is 5 and the reception power value corresponding to the first-width beam 1332 is 10.

That is, the controller 1300 may estimate that the receiver is located relatively close to a direction wherein a reception power value is high.

Figure 13B:
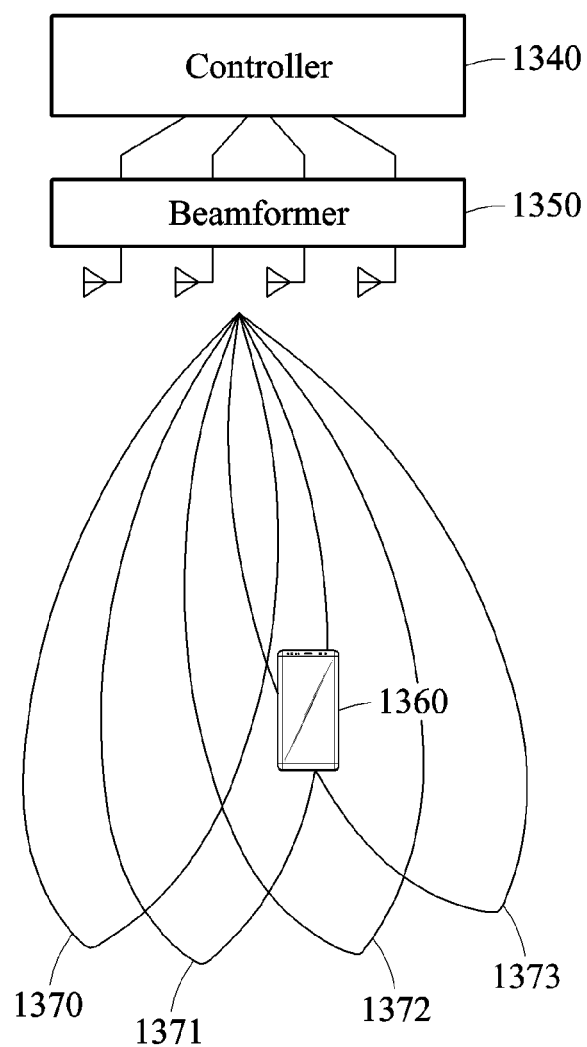
FIG. 13B is a view illustrating an operation wherein a wireless power transmission apparatus according to an embodiment of the present disclosure estimates the location of a receiver by transmitting beams with a second width.

FIG. 13B is a view illustrating an operation wherein a wireless power transmission apparatus according to an embodiment of the present disclosure estimates the location of a receiver by transmitting beams with a second width.

Referring to FIG. 13B, a controller 1340 serves to control antennas of a beamformer 1350 to form beams with the second width and sequentially transmit the beams with the second width such that portions of the beams overlap. Here, the beams with the second width may be formed to have a relatively narrow width, compared to the beams with the first width.

In accordance with an embodiment of the present disclosure, the controller 1340 may serve to control some of antennas of the beamformer 1350 to sequentially form beams with the first width.

For example, the beamformer 1350 sequentially transmit second-width beams 1370 to 1373.

That is, the beamformer 1350 may transmit first-width beams 1370, 1371, 1372, and 1373.

In accordance with an embodiment of the present disclosure, the controller 1300 may serve to control a reception part (not shown) to receive a reception power value corresponding to the second-width beam 1371 and a reception power value corresponding to the second-width beam 1372 from a receiver 1360 via feedback signals.

For example, the controller 1300 may determine that the receiver is not located in a region corresponding to the second-width beam 1370 when feedback signals of the second-width beam 1370 are not received for a certain time after transmitting the second-width beam 1370.

Meanwhile, the controller 1300 may accurately calculate the phase of the receiver 1360 using the reception power value corresponding to the second-width beam 1371 and the reception power value corresponding to the second-width beam 1372.

In accordance with another embodiment of the present disclosure, the controller 1300 may accurately calculate the phase of the receiver 1360 using the reception power value corresponding to the second-width beam 1372 and the reception power value corresponding to the second-width beam 1373 when the reception power value corresponding to the second-width beam 1371 is smaller than the reception power value corresponding to the second-width beam 1373.

Figure 14A:
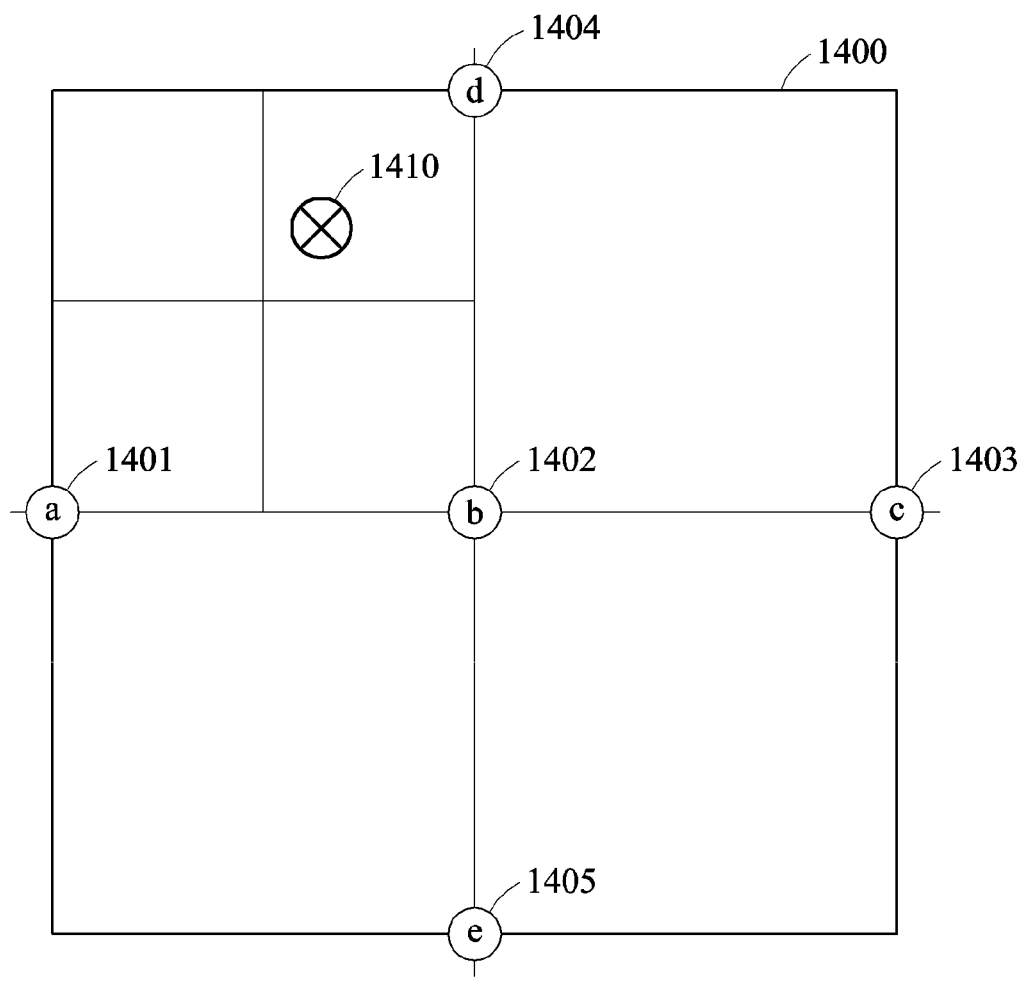
FIGS. 14A and 14B are views illustrating operations wherein a wireless power transmission apparatus according to an embodiment of the present disclosure estimates the location of a receiver by performing 3D beamforming.
Figure 14B:
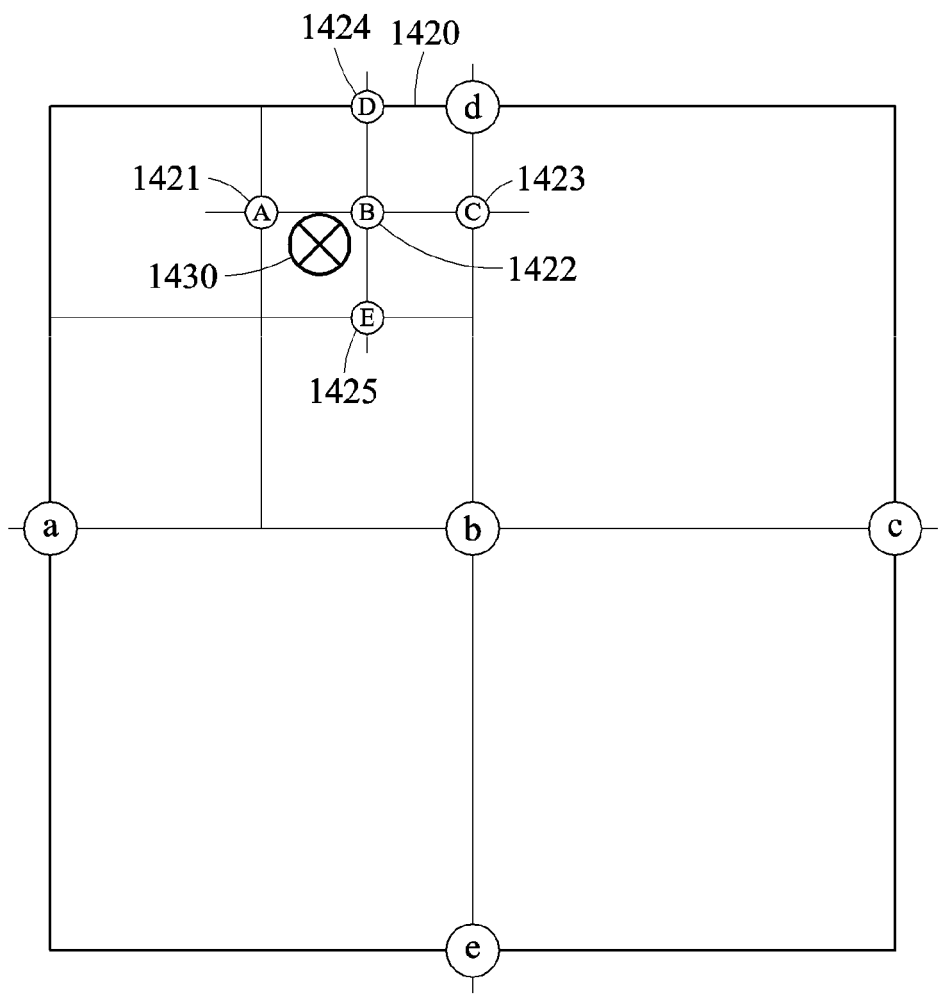

FIGS. 14A and 14B are views illustrating operations wherein a wireless power transmission apparatus according to an embodiment of the present disclosure estimates the location of a receiver by performing 3D beamforming.

Referring to FIG. 14A, the wireless power transmission apparatus may quadrisect a region 1400 based on horizontal and vertical axes and may transmit beams with the first width to contact points of the quadrisected regions.

More particularly, the wireless power transmission apparatus may transmit the beams with the first width to first, second, third, fourth, and fifth points 1401, 1402, 1403, 1404, and 1405 by controlling some of the antennas.

The wireless power transmission apparatus may receive reception power values corresponding to the beams with the first width, transmitted to the first, second, and fourth points 1401, 1402, and 1404, through feedback signals from the receiver 1410.

For example, a reception power value corresponding to the beam with the first width transmitted to the first point 1401 may be 20, a reception power value corresponding to the beam with the first width transmitted to the second point 1402 may be 40, a reception power value corresponding to the beam with the first width transmitted to the third point 1403 may be 10, a reception power value corresponding to the beam with the first width transmitted to the fourth point 1404 may be 60, and a reception power value corresponding to the beam with the first width transmitted to the fifth point 1405 may be 5.

Accordingly, the wireless power transmission apparatus may roughly estimate that the receiver 1410 is located in a region, end points of which the first, second, and fourth points 1401, 1402, and 1404 form.

Referring to FIG. 14B, the wireless power transmission apparatus may transmit beams with the second width to sixth, seventh, eighth, ninth, and tenth points 1421, 1422, 1423, 1424, and 1425 based on a roughly estimated location of a receiver 1430.

For example, the wireless power transmission apparatus may quadrisect a region 1420 based on horizontal and vertical axes and transmit beams with the second width to locations corresponding to ends of the region 1420.

In accordance with an embodiment of the present disclosure, the wireless power transmission apparatus may receive reception power values corresponding to the beams with the second width, transmitted to the sixth, seventh, and tenth points 1421, 1422, and 1425, through feedback signals from the receiver 1430.

Accordingly, the wireless power transmission apparatus may accurately estimate a location of the receiver 1430 based on a ratio of reception power values that correspond to the beams with the second width transmitted to the sixth, seventh, and tenth points 1421, 1422, and 1425.

The present disclosure may accurately confirm the location of the receiver by performing 3D beamforming through horizontal and vertical beamforming.

Here, the horizontal beamforming may include an operation of forming beams at at least one point on a horizontal axis dividing a region that is to be beamformed.

Meanwhile, the vertical beamforming may include an operation of forming beams at at least one point on a vertical axis dividing a region that is to be beamformed.

In accordance with another embodiment of the present disclosure, the wireless power transmission apparatus may estimate a horizontal location of the receiver using two high values among reception power values of the horizontal beamforming.

In addition, the wireless power transmission apparatus may estimate a vertical location of the receiver using two high values among reception power values of the vertical beamforming.

More particularly, the wireless power transmission apparatus may estimate a horizontal location of the receiver using the reception power values of the sixth and seventh points 1421 and 1422 and may estimate a vertical location of the receiver using the reception power values of the seventh and tenth points 1422 and 1425.

For example, the horizontal location may be related to the width of the receiver, and the vertical location may be related to the height of the receiver.

FIG. 15 is a view illustrating a method of wirelessly transmitting power according to an embodiment of the present disclosure.

In particular, FIG. 15 exemplifies a procedure of a method of wirelessly transmitting power, characterized by estimating the location of a receiver by controlling the width of a beam, and then transmitting wireless power to the estimated receiver location.

Referring to FIG. 15, in step 1501 of the method of wirelessly transmitting power, beams with a first width may be formed and may be sequentially transmitted to different spaces.

That is, in the method of wirelessly transmitting power, beams with a wide width may be formed and sequentially transmitted to spaces. For example, the spaces to which the beams with a wide width are sequentially transmitted may be physically separated from each other and may include different spaces that at least partially overlap.

In step 1502 of the method of wirelessly transmitting power, reception power values corresponding to the beams with the first width may be received.

That is, in the method of wirelessly transmitting power, reception power values may be received by receiving feedback signals that are related to the reception power values corresponding to the beams with the first width, through Bluetooth beacon signals, from the receiver.

In step 1503 of the method of wirelessly transmitting power, a phase of the receiver may be calculated using a plurality of high reception power values based on magnitude.

That is, in the method of wirelessly transmitting power, a phase of the receiver may be calculated using a beam with a highest reception power value and a beam with a second highest reception power value among beams with the first width.

In step 1504 of the method of wirelessly transmitting power, the location of the receiver may be estimated based on the phase of the receiver.

That is, in the method of wirelessly transmitting power, a rough location of the receiver may be estimated according to the phase of the receiver.

In step 1505 of the method of wirelessly transmitting power, beams with a second width narrower than the first width may be formed and transmitted based on the location of the receiver.

That is, in the method of wirelessly transmitting power, beams with a second width narrower than the first width may be formed and, based on the estimated receiver location, sequentially transmitted to different spaces that are physically separated from each other and at least partially overlap.

In step 1506 of the method of wirelessly transmitting power, reception power values corresponding to the beams with the second width may be received.

That is, in the method of wirelessly transmitting power, feedback signals related to the reception power values corresponding to the beams with the second width may be received through Bluetooth beacon signals from the receiver.

In step 1507 of the method of wirelessly transmitting power, the phase of the receiver may be further calculated using a plurality of high reception power values based on magnitudes of the reception power values received by the second width.

That is, in the method of wirelessly transmitting power, the phase of the receiver may be further calculated using reception power values of a beam with a highest reception power value and a beam with a second highest reception power value among the beams with the second width.

In step 1508 of the method of wirelessly transmitting power, the location of the receiver may be re-estimated based on the phase of the receiver further calculated by the second width.

That is, in the method of wirelessly transmitting power, an accurate location of the receiver may be estimated according to the further calculated receiver phase.

The present disclosure may roughly estimate the location of the receiver by controlling some antennas among the plurality of antennas that perform beamforming and may transmit wireless power to the estimated location by controlling the plurality of antennas.

Figure 16:
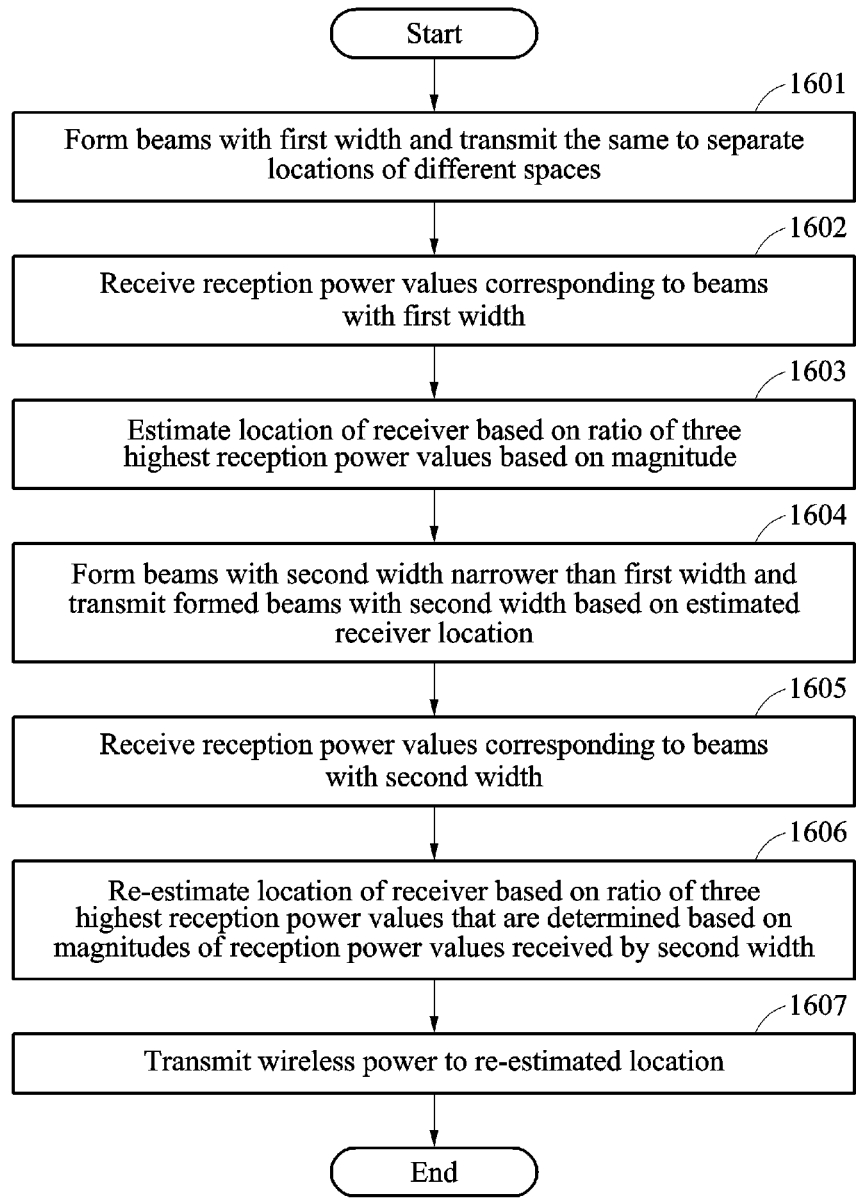

FIG. 16 is a view illustrating a method of wirelessly transmitting power according to an embodiment of the present disclosure.

In particular, FIG. 16 exemplifies a procedure of a method of wirelessly transmitting power, characterized by estimating the location of a receiver by performing 3D beamforming, and then transmitting wireless power to the estimated receiver location.

Referring to FIG. 16, in step 1601 of the method of wirelessly transmitting power, beams with the first width may be formed and transmitted to separate locations of different spaces.

That is, in the method of wirelessly transmitting power, the beams with the first width may be sequentially transmitted to separate locations of different spaces separated based on horizontal and vertical axes.

In step 1602 of the method of wirelessly transmitting power, reception power values corresponding to the beams with the first width may be received.

That is, in the method of wirelessly transmitting power, reception power values may be confirmed by receiving feedback signals, related to the reception power values corresponding to the beams with the first width, through Bluetooth beacon signals.

In step 1603 of the method of wirelessly transmitting power, the location of the receiver may be estimated based on a ratio of three highest reception power values.

That is, in the method of wirelessly transmitting power, the location of the receiver may be estimated using a ratio of reception power values of locations with three highest reception power values.

In step 1604 of the method of wirelessly transmitting power, beams with a second width narrower than the first width may be formed and transmitted to the location of the receiver.

That is, in step 1603 of the method of wirelessly transmitting power, beams with the second width may be transmitted to separate locations of different spaces separated by horizontal and vertical axes based on the estimated receiver location.

In step 1605 of the method of wirelessly transmitting power, reception power values corresponding to the beams with the second width may be received.

That is, in the method of wirelessly transmitting power, reception power values may be confirmed by receiving feedback signals, related to the reception power values corresponding to the beams with the second width, through Bluetooth beacon signals.

In step 1606 of the method of wirelessly transmitting power, the location of the receiver may be re-estimated based on a ratio of three highest reception power values that are determined based on magnitudes of the reception power values received by the second width.

That is, in the method of wirelessly transmitting power, the location of the receiver may be estimated based on a ratio of reception power values of locations with three highest reception power values received by the second width.

In step 1607 of the method of wirelessly transmitting power, wireless power may be transmitted to the re-estimated location.

That is, in the method of wirelessly transmitting power, beams may be accurately concentrated on the re-estimated receiver location and wireless power may be transmitted thereto.

Meanwhile, in the method of wirelessly transmitting power, the location of the receiver may be repeatedly estimated while more narrowly forming the width of a beam until the location of the receiver is accurately recognized.

Figure 17:
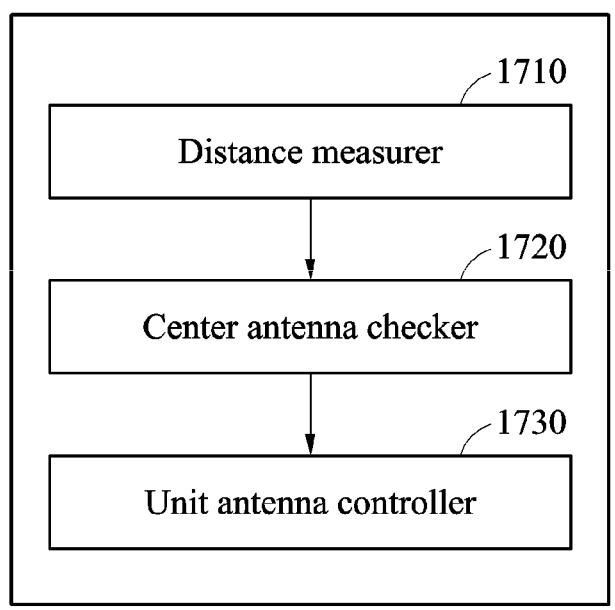
FIG. 17 illustrates a block diagram of an array antenna controller according to an embodiment of the present disclosure.

FIG. 17 illustrates a block diagram of an array antenna controller according to an embodiment of the present disclosure.

Referring to FIG. 17, an array antenna controller 1700 includes a distance measurer 1710, a center antenna checker 1720, and a unit antenna controller 1730.

The distance measurer 1710 may serve to measure a distance between unit antennas constituting an array antenna for outputting wireless power signals and a reception antenna of a wireless power receiver for receiving wireless power signals.

The array antenna controller 1700 may operate in an environment wherein power is transmitted from a wireless power transmitter to a wireless power receiver.

The wireless power transmitter may include an array antenna for outputting wireless power signals.

That is, the wireless power transmitter may output wireless power signals to the wireless power receiver through the array antenna.

The array antenna may be constituted of a plurality of unit antennas.

Power which is supplied from a power source to the array antenna may be uniformly distributed to each of the unit antennas.

For example, when the number of unit antennas constituting the array antenna is N and the number of turned-on unit antennas is M, power may be uniformly supplied by 1/N to each of the unit antennas and transmitted by M/N.

Here, "uniform supply" may mean that the amounts of power basically supplied are the same, and phases may be the same or differently set depending upon beam steering.

The wireless power receiver may include a reception antenna for receiving a wireless power signal.

Hereinafter, the reception antenna may be referred to as a wireless power receiver.

The array antenna controller 1700 may be included in the wireless power transmitter.

The array antenna controller 1700 may serve to measure a distance between each of the unit antennas and the reception antenna.

For example, the distance measurer 1710 may measure a distance using a signal transmission/reception time difference between each of the unit antennas and the reception antenna.

Here, the array antenna controller 1700 may receive a signal arrival time from the reception antenna.

The center antenna checker 1720 may verify a center antenna, which is disposed at a minimum distance from the wireless power receiver, among the unit antennas based on a measured distance.

The center antenna checker 1720 may verify a center antenna among unit antennas constituting the array antenna.

The center antenna may be a unit antenna disposed at a minimum distance from the wireless power receiver.

That is, the center antenna checker 1720 may verify a minimum distance among measured distances and a unit antenna disposed at the minimum distance.

The unit antenna controller 1730 may turn on unit antennas in a predetermined region based on the center antenna.

The predetermined region may be a region with a radius that corresponds to twice a minimum distance with respect to the center antenna.

The number of unit antennas included in the predetermined region may be proportional to the minimum distance.

The unit antenna controller 1730 may turn on unit antennas included in the predetermined region with respect to the center antenna.

In addition, the unit antenna controller 1730 may turn boundary antennas on or off using a power transmission efficiency manager (not shown).

The array antenna controller 1700 may further include a power transmission efficiency manager (not shown).

The power transmission efficiency manager may turn boundary antennas partially included in the predetermined region on or off and compare consequent power transmission efficiencies.

The partially included boundary antennas may be unit antennas that are partially included in the predetermined region.

The power transmission efficiency manager may calculate power transmission efficiencies by turning on the unit antennas included in the predetermined region and the boundary antennas using the unit antenna controller 1730.

The power transmission efficiency manager may calculate power transmission efficiencies by turning on the unit antennas included in the predetermined region and the boundary antennas using the unit antenna controller 1730.

The power transmission efficiency manager may compare a power transmission efficiency calculated by turning on the boundary antennas to a power transmission efficiency calculated by turning on the boundary antennas.

The power transmission efficiency manager may make the unit antenna controller 1730 to the boundary antennas turn on or off so as to have an optimal power transmission efficiency based on the power transmission efficiency comparison result.

Figure 18:
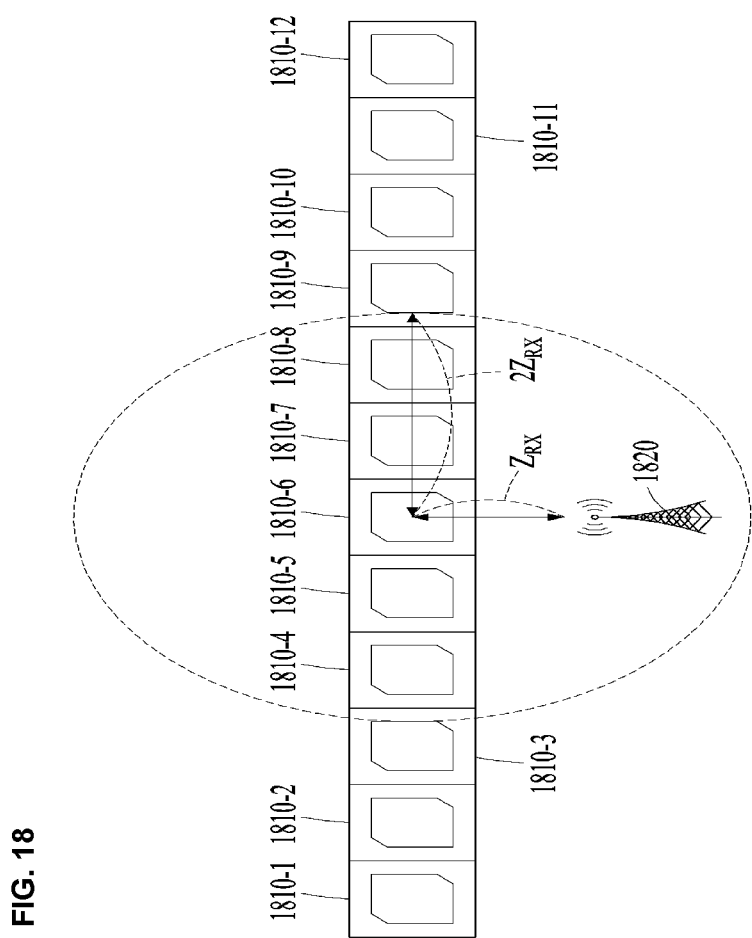
FIG. 18 is a view illustrating an operation of an array antenna controller.

FIG. 18 is a view illustrating an operation of an array antenna controller.

Referring to FIG. 18, an array antenna controlled by the array antenna controller 1700 illustrated in FIG. 17 may output wireless power signals to a wireless power receiver.

The array antenna may be constituted of 12 unit antennas.

The array antenna controller 1700 may measure a distance between each of unit antennas constituting the array antenna and the wireless power receiver.

For example, the array antenna controller 1700 may measure a distance between a unit antenna 1 and the wireless power receiver.

The array antenna controller 1700 may measure a distance between a unit antenna 2 and the wireless power receiver.

The array antenna controller 1700 may measure a distance between a unit antenna 12 and the wireless power receiver.

That is, the array antenna controller 1700 may measure a distance between each of unit antennas and the wireless power receiver.

The array antenna controller 1700 may verify a unit antenna 6, disposed at a minimum distance ($Z_{RX}$) among measured distances, as a center antenna.

The array antenna controller 1700 may turn on a unit antenna included in a region with a radius ($2Z_{RX}$) that corresponds to twice the minimum distance ($Z_{RX}$) based on the center antenna to output a wireless power signal.

That is, the array antenna controller 1700 may turn on unit antennas 4 to 8 to output wireless power signals.

As such, the array antenna controller 1700 may turn on unit antennas, thereby improving wireless power transmission efficiency.

In addition, the array antenna controller 1700 may turn on or off boundary antennas partially included in a predetermined region to calculate power efficiencies and compare the power efficiencies in the turn-on and turn-off cases to turn the boundary antennas on or off.

For example, the array antenna controller 1700 may turn on boundary antennas when it is better to turn on the boundary antennas in terms of power transmission efficiency and turn off the boundary antennas when it is better to turn off the boundary antennas in terms of power transmission efficiency.

Figure 19:
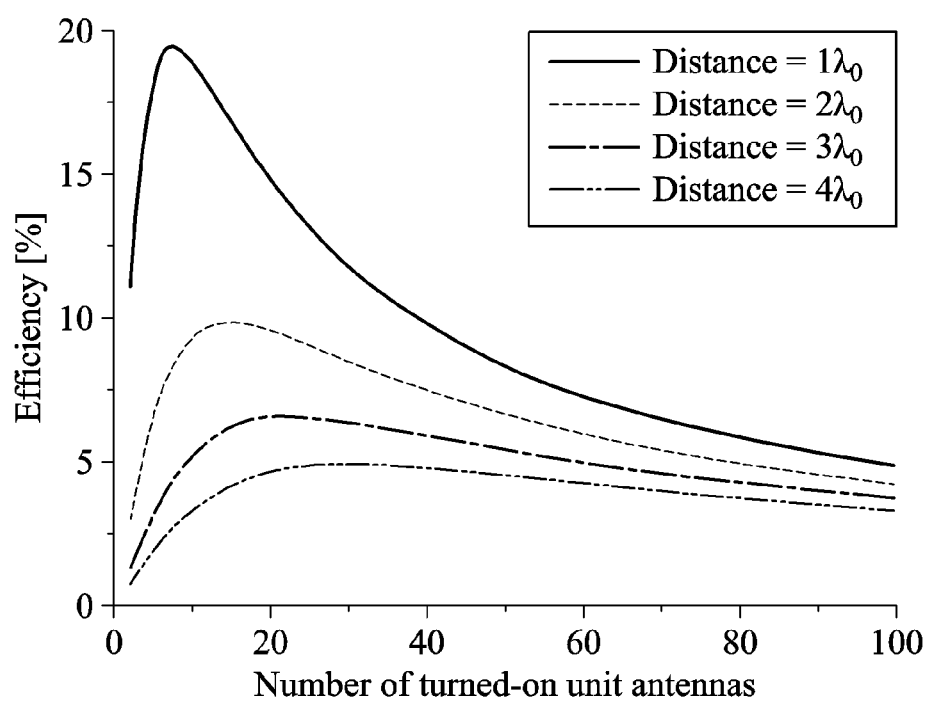

FIG. 19 is a graph illustrating efficiency dependent upon the number of unit antennas turned on.

Referring to FIG. 19, a distance (r) from a unit antenna k located at a k-th location in an array antenna to a wireless power receiver may be calculated according to Equation 8 below:

$$r = \sqrt{(X_1 - X_{RX})^2 + Z_{RX}^2} \quad \text{[Equation 8]}$$

Here, when the center of the array antenna is located at an origin, a location of a unit antenna is $X_l$ and a location of a reception antenna is $(X_{RX}, Z_{RX}^-)$. A power transmission efficiency ($\eta$) between transmission/reception antennas may be calculated according to Equation 9 below:

$$\eta = \frac{P_{RX}}{P_{TX}} = 1 - e^{-\tau^2} \quad \text{[Equation 9]}$$

Here, $$\tau^2 = \left(\frac{\lambda}{4\pi}\right)^2 G_{TX} G_{RX}$$

and $$G_{TX} = G_0 \cos\theta = G_0 \frac{R}{r},$$

wherein $G_{TX}$ may be a gain of a transmission antenna, $G_{RX}$ may be a gain of a reception antenna, a gain may be $G_0$ when a direction of a maximum gain appears at 0 degrees, and $\theta$ may be a direction tilted from a direction of a maximum gain.

When beams are focused through phase control using the array antenna and only M unit antennas close to the reception antenna of the array antenna are turned on, a power transmission efficiency may be calculated according to Equation 10 below:

$$\eta_{array} = \frac{\left(\sum_{k=1}^{M} \sqrt{\eta_{\frac{N}{2} - \frac{M}{2} + k}}\right)^2}{M} \quad \text{[Equation 10]}$$

When beams are focused through phase control, an electromagnetic wave magnitude which each unit antenna forms at a location of a reception antenna may be calculated using a gain of the unit antenna and a distance between the unit antenna and the reception antenna and, using the calculated electromagnetic wave magnitude, power transmission efficiency of an array antenna may be calculated according to Equation 10.

FIG. 19 illustrates graphs of results obtained by Equation 10.

When a distance is specified, a turned-on unit antenna number exhibiting highest efficiency may be verified. As shown in the graphs, an optimal turned-on unit antenna number exhibiting highest efficiency may be verified when a distance is specified.

That is, the array antenna controller 1700 shown in FIG. 17 may turn on about 20 antennas based on a center antenna at a minimum distance, $1\lambda_0$, thereby optimizing power transmission efficiency.

Here, $\lambda_0$ may be an output wavelength of a wireless power signal that is output by the array antenna.

In addition, the array antenna controller 1700 may turn on about 10 unit antennas based on a center antenna at a minimum distance, $2\lambda_0$, thereby optimizing power transmission efficiency.

Figure 20:
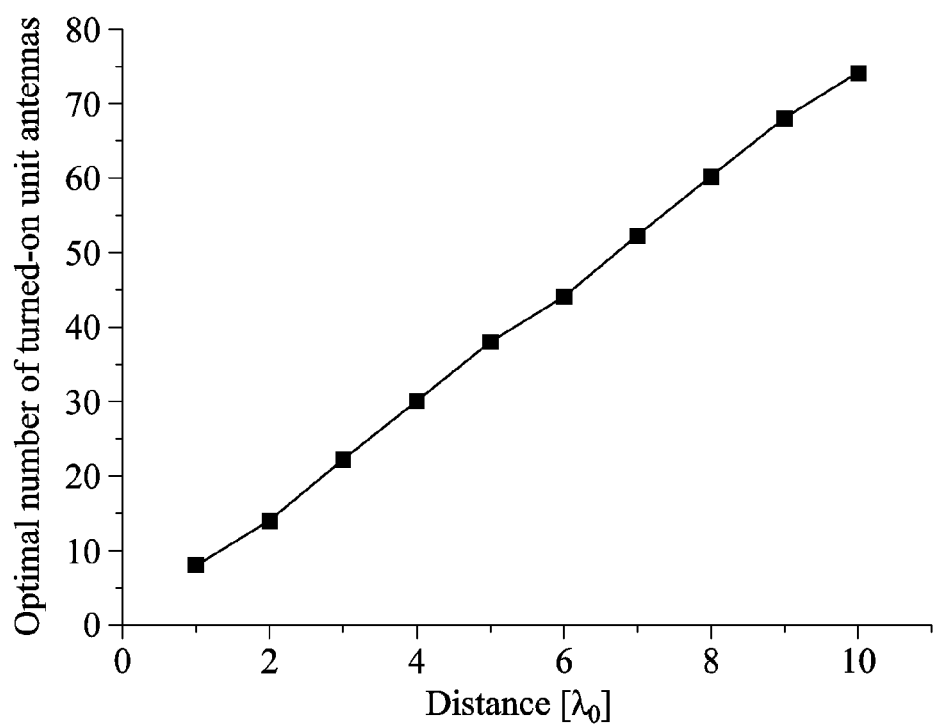
FIG. 20 is a graph illustrating the number of turned-on unit antennas that maximizes an efficiency dependent upon a distance between an array antenna and a wireless power receiver.

FIG. 20 is a graph illustrating the number of turned-on unit antennas that maximizes an efficiency dependent upon a distance between an array antenna and a wireless power receiver.

Referring to FIG. 20, it can be confirmed that the number of unit antennas turned on to have optimal efficiency increases with increasing distance.

In addition, it can be confirmed that it is efficient to turn on only antennas close to the receiver to focus beams as a distance is closer. It can be confirmed that, considering that the magnitude of a unit antenna is $0.5\lambda_0 * 0.5\lambda_0$, optimal power transmission efficiency may be obtained by, when a distance ($Z_{RX}$) from the wireless power receiver to the array antenna is determined, turning on unit antennas included in an area with a radius twice $Z_{RX}$ based on a unit antenna closest to the wireless power receiver.

This may be changed depending upon an array shape and antenna types used in the array, which may be verified through full-wave simulation.

Figure 21:
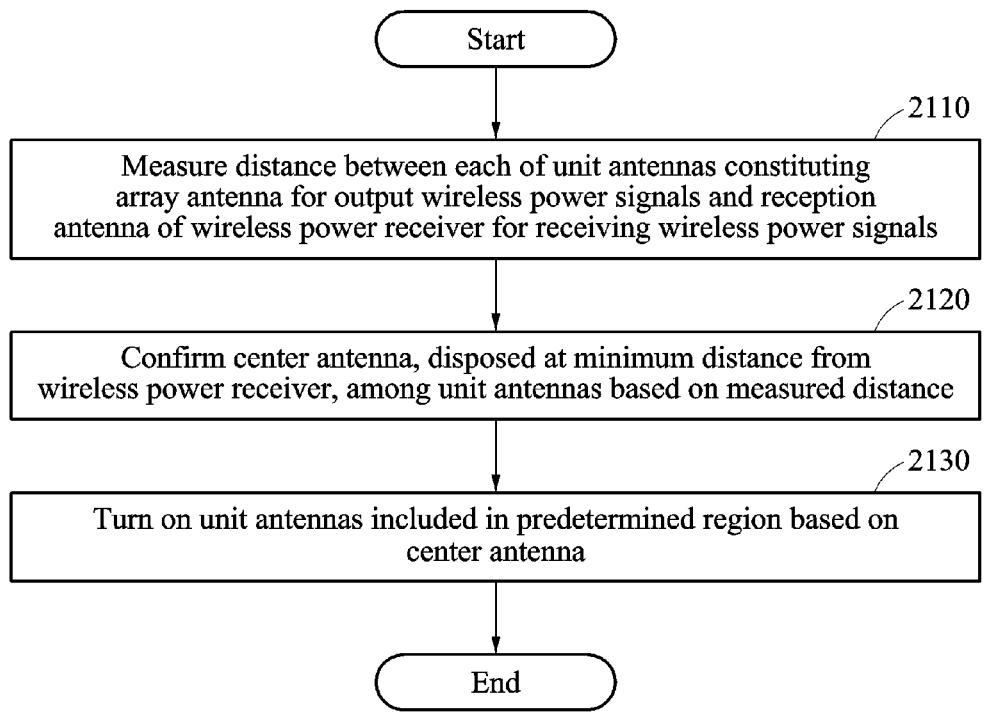
FIG. 21 is a flowchart illustrating a method of controlling an array antenna according to an embodiment of the present disclosure.

FIG. 21 is a flowchart illustrating a method of controlling an array antenna according to an embodiment of the present disclosure.

A method of controlling an array antenna shown in FIG. 21 may be performed using the array antenna controller 1700 described with reference to FIGS. 17 to 20.

In S2110, the array antenna controller 1700 may measure a distance between each of unit antennas, which constitute an array antenna and output wireless power signals, and a reception antenna of a wireless power receiver that receives the wireless power signals.

In S2120, the array antenna controller 1700 may verify a center antenna, disposed at a minimum distance from the wireless power receiver, among the unit antennas based on the measured distance.

In S2130, the array antenna controller 1700 may turn on unit antennas included in a predetermined region based on the center antenna.

Since the array antenna control method described with reference to FIG. 21 is the same as the method of operating the array antenna controller 1700 described with reference to FIGS. 17 to 20, a detailed description thereof is omitted.

As apparent from the above description, the present disclosure can improve wireless power transmission efficiency by accurately confirming the location of a receiver and forming beams at the location.

The present disclosure can reduce interference to the human body and other devices by roughly calculating a phase of the receiver based on a reception power value of the receiver and accurately calculating the phase of the receiver through adjustment of a beam width.

The present disclosure can accurately confirm the location of the receiver by performing 3D beamforming through horizontal and vertical beamforming.

The present disclosure can roughly estimate a location of the receiver by controlling some antennas among a plurality of antennas that perform beamforming and can transmit wireless power to the estimated location by controlling the plurality of antennas.

The present disclosure can roughly estimate the location of a receiver by controlling some antennas among a plurality of antennas that perform beamforming, thereby reducing power consumption.

The aforementioned device may be realized by a hardware component, a software component, and/or a combination of hardware and software components. For example, the device and components described in the embodiments may be realized using one or more general-purpose computers or special-purpose computers such as, for example, a processor, a controller, an arithmetic logic unit (ALU), a digital signal processor, a microcomputer, a field programmable array (FPA), a programmable logic unit (PLU), a microprocessor, or other devices implementing instructions and responding thereto. The processor may execute one or software applications that run on an operating system (OS). In addition, the processor may approach data, store, manipulate, and process the data, and generate new data by responding to running of software. Although one processor has been used to aid in understanding, those skilled in the art can understand that the processor may include a plurality of processing elements and/or a plurality of processing element types. For example, the processor may include a plurality of processors or a combination of one processor and controller. Further, another processing configuration, such as a parallel processor, may be applied.

Software may include a computer program, code, instructions, or a combination of one or more of the foregoing, and may configure a processing device to operate as desired or independently or collectively a command to a processing device. Software and/or data may be permanently or temporarily embodied in the form of any type of machines, components, physical devices, virtual equipment, computer storage media or devices, or a signal wave to be transmitted, so as to be interpreted by a processing device or to provide a command or date to a processing device. Software may be distributed over a networked computer system, and stored or executed in a distributed manner. Software and data may be stored on one or more computer readable media.

Embodiments of the present disclosure can include a computer readable medium including program commands for executing operations implemented through various computers. The computer readable medium can store program commands, data files, data structures or combinations thereof. The program commands recorded in the medium may be specially designed and configured for the present disclosure or be known to those skilled in the field of computer software. Examples of a computer readable recording medium include magnetic media such as hard disks, floppy disks and magnetic tapes, optical media such as CD-ROMs and DVDs, magneto-optical media such as floptical disks, or hardware devices such as ROMs, RAMs and flash memories, which are specially configured to store and execute program commands. Examples of the program commands include a machine language code created by a compiler and a high-level language code executable by a computer using an interpreter and the like. The hardware devices may be configured to operate as one or more software modules to perform operations in the embodiments, and vice versa.

Although exemplary embodiments of the present disclosure have been disclosed for illustrative purposes, those skilled in the art will appreciate that various modifications, additions and substitutions are possible, without departing from the scope and spirit of the disclosure as disclosed in the accompanying claims. For example, a proper result may be achieved even if the techniques described above are implemented in an order different from that for the disclosed method, and/or disclosed constituents such as a system, structure, device and circuit are coupled to or combined with each other in a form different from that for the disclosed method or replaced by other constituents or equivalents.

It should be understood, however, that there is no intent to limit the disclosure to the embodiments disclosed, rather, the disclosure is to cover all modifications, equivalents, and alternatives falling within the spirit and scope of the disclosure as defined by the claims.

DESCRIPTION OF SYMBOLS

1200: Wireless power transmission apparatus 1210: Beamformer
1220: Receiver 1230: Calculator
1240: Estimator

What is claimed is:

1. An apparatus for wirelessly transmitting power, comprising:
   a beamformer configured to form beams with a first width and sequentially transmit the formed beams with the first width to different spaces that are physically separated from each other and at least partially overlap;
   a reception part configured to receive reception power values corresponding to the transmitted beams with the first width;
   a calculator configured to calculate a phase of the receiver using a plurality of high reception power values based on magnitudes of the received reception power values; and
   an estimator configured to estimate a location of the receiver based on the calculated receiver phase,
   wherein wireless power is transmitted to the estimated receiver location.

2. The apparatus according to claim 1, wherein the beamformer forms beams with a second width narrower than the first width and, based on the estimated receiver location, sequentially transmit the formed beams with the second width to different spaces that are physically separated from each other and at least partially overlap.

3. The apparatus according to claim 2, wherein the reception part receives reception power values corresponding to the transmitted beams with the second width,
   the calculator calculates a phase of the receiver using a plurality of high reception power values based on magnitudes of the reception power values received by the second width, and the estimator re-estimates the location of the receiver based on the receiver phase calculated by the second width.

4. The apparatus according to claim 1, wherein the calculator determines first and second reception power values among the reception power values corresponding to the beams with the first width, reflects the first reception power value on a first phase value related to the first reception power value, reflects the second reception power value on a second phase value related to the second reception power value, sums a value obtained by reflecting the first reception power value on the first phase value and a value obtained by reflecting the second reception power value on the second phase value, and calculates a phase of the receiver based on a ratio of the first and second reception power values to the summed value.

5. The apparatus according to claim 4, wherein the first reception power value corresponds to a highest reception power value among the reception power values corresponding to the beams with the first width, and
the second reception power value corresponds to a second highest reception power value next to the first reception power value among the reception power values corresponding to the beams with the first width.

6. The apparatus according to claim 5, wherein the estimator estimates a location of the receiver in a direction between the beam corresponding to the first reception power value and the beam corresponding to the second reception power value based on the ratio of the first and second reception power values to the summed value.

7. The apparatus according to claim 1, wherein the beamformer receives Bluetooth beacon signals from the receiver, and then sequentially transmits the beams with the first width to the different spaces, and
the reception part receives feedback signals, related to the reception power values corresponding to the beams with the first width, through the Bluetooth beacon signals.

8. The apparatus according to claim 1, wherein the beamformer sequentially transmits the formed beams with the first width to separate locations of different spaces separated from each other based on horizontal and vertical axes,
the reception part receives reception power values corresponding to the transmitted beams with the first width, and
the estimator estimates a location of the receiver based on a ratio of three highest reception power values that are determined based on magnitudes of the received reception power values.

9. The apparatus according to claim 8, wherein the beamformer forms beams with a second width narrower than the first width and, based on the estimated receiver location, transmits the formed beams with the second width to a location, separated from other spaces based on horizontal and vertical axes, of any one space among different spaces that are separated from each other based on the horizontal and vertical axes.

10. The apparatus according to claim 9, wherein the reception part receives reception power values corresponding to the transmitted beams with the second width, and
the estimator re-estimates the location of the receiver based on a ratio of three highest reception power values related to the second width, based on magnitudes of the reception power values received by the second width.

11. The apparatus according to claim 9, wherein the beamformer controls some antennas among a plurality of antennas to form beams with the first width and controls the plurality of antennas to form beams with the second width.

12. A method of wirelessly transmitting power, the method comprising:
forming, by means of a beamformer, beams with a first width and sequentially transmitting the formed beams with the first width to different spaces that are physically separated from each other and at least partially overlap;
receiving, by means of a reception part, reception power values corresponding to the transmitted beams with the first width;
calculating, by means of a calculator, a phase of the receiver using a plurality of high reception power values based on magnitudes of the received reception power values;
estimating, by means of an estimator, a location of the receiver based on the calculated receiver phase, and
transmitting wireless power to the estimated receiver location.

13. The method according to claim 12, further comprising:
forming, by means of the beamformer, beams with a second width narrower than the first width and, based on the estimated receiver location, sequentially transmitting the formed beams with the second width to different spaces that are physically separated from each other and at least partially overlap;
receiving, by means of the reception part, reception power values corresponding to the transmitted beams with the second width;
calculating, by means of the calculator, a phase of the receiver using a plurality of high reception power values based on magnitudes of the reception power values received by the second width; and
re-estimating, by means of the estimator, the location of the receiver based on the receiver phase calculated by the second width.

14. The method according to claim 12, wherein the calculating comprises:
determining first and second reception power values among the reception power values corresponding to the beams with the first width,
reflecting the first reception power value on a first phase value related to the first reception power value,
reflecting the second reception power value on a second phase value related to the second reception power value,
summing a value obtained by reflecting the first reception power value on the first phase value and a value obtained by reflecting the second reception power value on the second phase value, and
calculating a phase of the receiver based on a ratio of the first and second reception power values to the summed value.

15. The method according to claim 12, further comprising:
sequentially transmitting, by means of the beamformer, the formed beams with the first width to separate locations of different spaces separated from each other based on horizontal and vertical axes;
receiving, by means of the reception part, reception power values corresponding to the transmitted beams with the first width;
estimating, by means of the estimator, a location of the receiver based on a ratio of three highest reception power values that are determined based on magnitudes of the received reception power values;

forming, by means of the beamformer, beams with a second width narrower than the first width and, based on the estimated receiver location, transmitting the formed beams with the second width to a location, separated from other spaces based on horizontal and vertical axes, of any one space among different spaces that are separated from each other based on the horizontal and vertical axes;

receiving, by means of the reception part, reception power values corresponding to the transmitted beams with the second width; and re-estimating, by means of the estimator, the location of the receiver based on a ratio of three highest reception power values related to the second width, based on magnitudes of the reception power values received by the second width.

* * * * *